United States Patent
Chen et al.

(10) Patent No.: US 10,921,555 B2
(45) Date of Patent: Feb. 16, 2021

(54) OPTICAL IMAGING LENS

(71) Applicant: GENIUS ELECTRONIC OPTICAL (XIAMEN) CO., LTD., Fujian (CN)

(72) Inventors: Feng Chen, Fujian (CN); Yanxuan Yin, Fujian (CN); Ta-Cheng Fan, Taichung (TW)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 253 days.

(21) Appl. No.: 16/015,191

(22) Filed: Jun. 22, 2018

(65) Prior Publication Data

US 2019/0302410 A1 Oct. 3, 2019

(30) Foreign Application Priority Data

Mar. 30, 2018 (CN) .......................... 2018 1 0294461

(51) Int. Cl.
*G02B 9/62* (2006.01)
*G02B 13/00* (2006.01)

(52) U.S. Cl.
CPC ........... *G02B 9/62* (2013.01); *G02B 13/0045* (2013.01)

(58) Field of Classification Search
CPC ..... G02B 9/62; G02B 13/0045; G02B 13/005

USPC ......................................... 359/713, 752, 756
See application file for complete search history.

(56) References Cited

U.S. PATENT DOCUMENTS

| | | | |
|---|---|---|---|
| 2014/0092491 A1* | 4/2014 | Hsu ..................... | G02B 13/0045 359/761 |
| 2015/0131169 A1* | 5/2015 | Asami ..................... | G02B 9/62 359/713 |
| 2017/0269342 A1* | 9/2017 | Jung ..................... | G02B 13/06 |
| 2018/0136443 A1* | 5/2018 | Yin ..................... | G02B 27/0025 |

* cited by examiner

*Primary Examiner* — Darryl J Collins
*Assistant Examiner* — Journey F Sumlar
(74) *Attorney, Agent, or Firm* — JCIPRNET

(57) ABSTRACT

An optical imaging lens includes a first, a second, a third, a fourth, a fifth, and a sixth lens elements from an object side to an image side arranged in order along an optical axis. The six lens elements are the only lens elements having refracting power in the optical imaging lens. An optical axis region of an image-side surface of the second lens element is convex. An optical axis region of an object-side surface of the third lens element is concave. An optical axis region of an object-side surface of the fourth lens element is convex. The fifth lens element has positive refracting power, and an optical axis region of the object-side surface of the fifth lens element is concave. The optical imaging lens satisfies: V3−V6≥20,000. V3 is an Abbe number of the third lens element. V6 is an Abbe number of the sixth lens element.

19 Claims, 33 Drawing Sheets

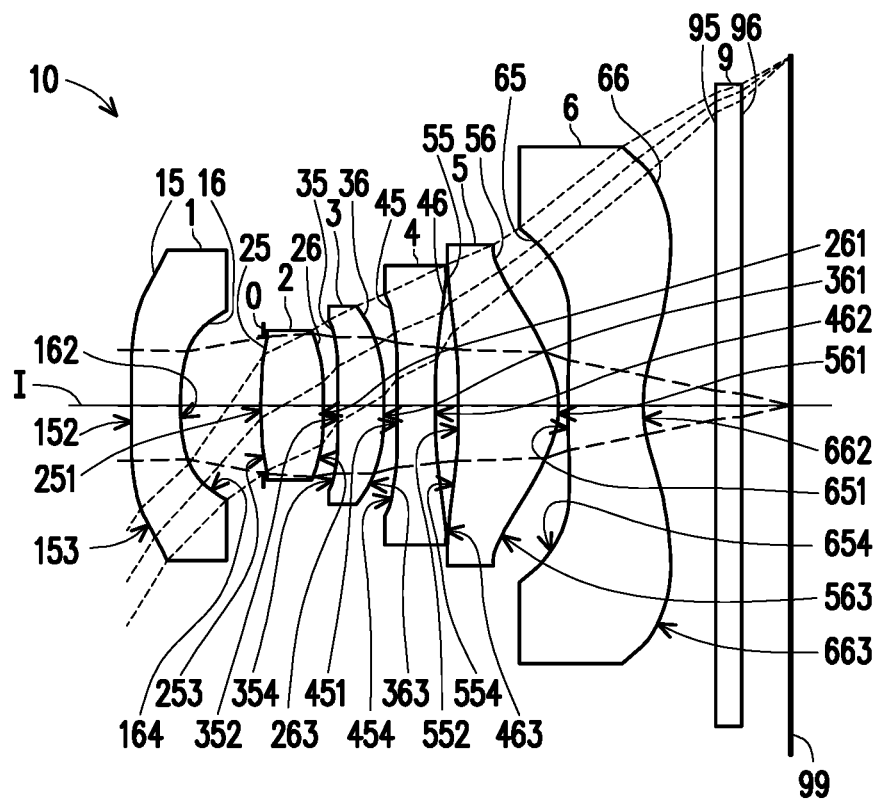
FIG. 6
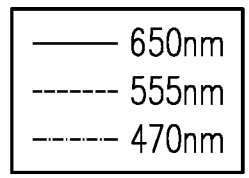
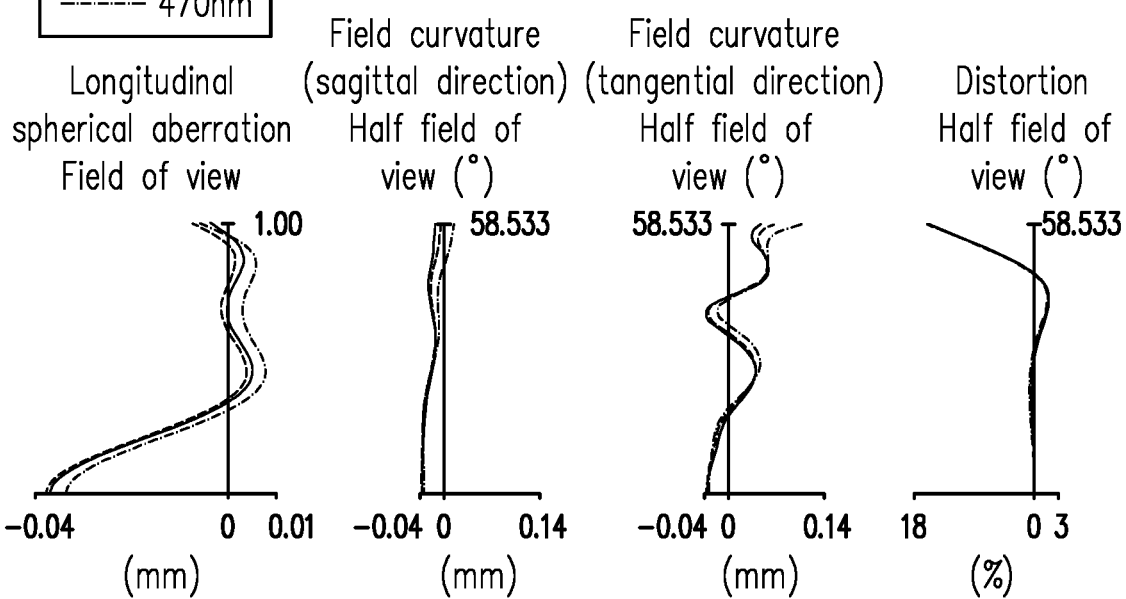
FIG. 7A   FIG. 7B   FIG. 7C   FIG. 7D

| First embodiment |||||||
|---|---|---|---|---|---|---|
| TTL=5.411 mm, EFL=2.115 mm, HFOV=58.533°, image height=2.880 mm, Fno=2.250 |||||||
| Element | Surface | Radius(mm) | Distance (mm) | Refractive index | Abbe number | Focal length(mm) |
| Object | | Infinity | Infinity | | | |
| First lens element 1 | Object-side surface 15 | -8.988 | 0.400 | 1.545 | 55.987 | -3.732 |
| | Image-side surface 16 | 2.678 | 0.690 | | | |
| Aperture 0 | | Infinity | -0.031 | | | |
| Second lens element 2 | Object-side surface 25 | 3.146 | 0.517 | 1.545 | 55.987 | 2.509 |
| | Image-side surface 26 | -2.288 | 0.115 | | | |
| Third lens element 3 | Object-side surface 35 | -25.194 | 0.383 | 1.545 | 55.987 | 5.033 |
| | Image-side surface 36 | -2.492 | 0.102 | | | |
| Fourth lens element 4 | Object-side surface 45 | 38.176 | 0.315 | 1.661 | 20.412 | -7.477 |
| | Image-side surface 46 | 4.397 | 0.191 | | | |
| Fifth lens element 5 | Object-side surface 55 | -2.391 | 0.824 | 1.545 | 55.987 | 1.703 |
| | Image-side surface 56 | -0.751 | 0.077 | | | |
| Sixth lens element 6 | Object-side surface 65 | 7.621 | 0.618 | 1.642 | 22.409 | -1.797 |
| | Image-side surface 66 | 0.977 | 0.600 | | | |
| Filter 9 | Object-side surface 95 | Infinity | 0.210 | 1.517 | 64.167 | |
| | Image-side surface 96 | Infinity | 0.401 | | | |
| | Image plane 99 | Infinity | | | | |

FIG. 8

| Surface | K | $a_4$ | $a_6$ | $a_8$ | $a_{10}$ |
|---|---|---|---|---|---|
| 15 | 0.000000E+00 | 3.912493E-01 | -4.214719E-01 | 4.643121E-01 | -3.810050E-01 |
| 16 | 1.026984E+01 | 6.183443E-01 | -2.533649E-01 | -1.298965E+00 | 8.558444E+00 |
| 25 | -1.981703E+00 | 5.396468E-02 | 2.458675E-01 | -1.361241E+00 | 2.704142E+00 |
| 26 | 0.000000E+00 | 7.395776E-02 | -1.757602E+00 | 9.510961E+00 | -3.272687E+01 |
| 35 | 0.000000E+00 | -7.388135E-03 | -1.413900E+00 | 4.494184E+00 | -1.077187E+01 |
| 36 | 0.000000E+00 | 4.731706E-02 | -2.297963E+00 | 8.504037E+00 | -1.735180E+01 |
| 45 | 0.000000E+00 | 1.662566E-02 | -1.756166E+00 | 5.683828E+00 | -8.215807E+00 |
| 46 | 0.000000E+00 | 6.930630E-02 | -5.671277E-01 | 1.105919E+00 | -6.237204E-01 |
| 55 | 0.000000E+00 | 2.426394E-01 | -3.268002E-01 | 7.581139E-01 | -1.719091E+00 |
| 56 | -2.326427E+00 | 2.940665E-01 | -1.174069E+00 | 2.907743E+00 | -4.765997E+00 |
| 65 | -1.437126E+01 | 7.514619E-02 | -6.428304E-01 | 1.225026E+00 | -1.512911E+00 |
| 66 | -6.943006E+00 | -1.022593E-01 | 2.633425E-02 | 2.000141E-02 | -2.805838E-02 |
| Surface | $a_{12}$ | $a_{14}$ | $a_{16}$ | $a_{18}$ | $a_{20}$ |
| 15 | 2.100883E-01 | -7.405071E-02 | 1.203103E-02 | 0.000000E+00 | 0.000000E+00 |
| 16 | -1.954687E+01 | 2.387380E+01 | -1.301679E+01 | 0.000000E+00 | 0.000000E+00 |
| 25 | -3.270523E+00 | 5.519311E+00 | -7.379137E+00 | 0.000000E+00 | 0.000000E+00 |
| 26 | 6.730911E+01 | -7.702665E+01 | 3.805046E+01 | 0.000000E+00 | 0.000000E+00 |
| 35 | 1.691620E+01 | -1.742245E+01 | 1.010353E+01 | 0.000000E+00 | 0.000000E+00 |
| 36 | 2.068194E+01 | -1.419254E+01 | 4.751378E+00 | 0.000000E+00 | 0.000000E+00 |
| 45 | 5.324215E+00 | -7.530830E-01 | -4.904130E-01 | 0.000000E+00 | 0.000000E+00 |
| 46 | -6.771286E-01 | 1.187448E+00 | -6.398423E-01 | 1.185577E-01 | 0.000000E+00 |
| 55 | 2.572210E+00 | -2.199436E+00 | 9.969828E-01 | -1.898065E-01 | 0.000000E+00 |
| 56 | 5.268213E+00 | -3.845017E+00 | 1.764657E+00 | -4.564540E-01 | 5.015139E-02 |
| 65 | 1.230526E+00 | -6.477894E-01 | 2.085459E-01 | -3.653541E-02 | 2.613466E-03 |
| 66 | 1.588410E-02 | -5.221854E-03 | 1.023913E-03 | -1.113394E-04 | 5.186978E-06 |

FIG. 9

| Second embodiment | | | | | | |
|---|---|---|---|---|---|---|
| TTL=4.865 mm, EFL=2.497 mm, HFOV=58.439°, image height=2.880 mm, Fno=2.250 | | | | | | |
| Element | Surface | Radius(mm) | Distance (mm) | Refractive index | Abbe number | Focal length(mm) |
| Object | | Infinity | Infinity | | | |
| First lens element 1 | Object-side surface 15 | -11.911 | 0.390 | 1.545 | 55.987 | -4.235 |
| | Image-side surface 16 | 2.905 | 0.464 | | | |
| Aperture 0 | | Infinity | -0.062 | | | |
| Second lens element 2 | Object-side surface 25 | 2.853 | 0.491 | 1.545 | 55.987 | 2.707 |
| | Image-side surface 26 | -2.883 | 0.126 | | | |
| Third lens element 3 | Object-side surface 35 | -41.315 | 0.371 | 1.545 | 55.987 | 5.490 |
| | Image-side surface 36 | -2.805 | 0.037 | | | |
| Fourth lens element 4 | Object-side surface 45 | 3.571 | 0.293 | 1.661 | 20.412 | -10.527 |
| | Image-side surface 46 | 2.290 | 0.317 | | | |
| Fifth lens element 5 | Object-side surface 55 | -2.146 | 0.624 | 1.545 | 55.987 | 1.765 |
| | Image-side surface 56 | -0.734 | 0.057 | | | |
| Sixth lens element 6 | Object-side surface 65 | 4.854 | 0.547 | 1.642 | 22.409 | -1.679 |
| | Image-side surface 66 | 0.849 | 0.600 | | | |
| Filter 9 | Object-side surface 95 | Infinity | 0.210 | 1.517 | 64.167 | |
| | Image-side surface 96 | Infinity | 0.401 | | | |
| | Image plane 99 | Infinity | | | | |

FIG. 12

| Surface | K | $a_4$ | $a_6$ | $a_8$ | $a_{10}$ |
|---|---|---|---|---|---|
| 15 | 0.000000E+00 | 3.573309E-01 | -4.364937E-01 | 4.591323E-01 | -3.874696E-01 |
| 16 | 1.239460E+01 | 6.236745E-01 | -2.897827E-01 | -1.427330E+00 | 8.600278E+00 |
| 25 | 8.290279E+00 | 1.156811E-01 | -1.887638E-01 | -1.039815E+00 | 2.898604E+00 |
| 26 | 0.000000E+00 | -9.561744E-02 | -8.616374E-01 | 5.355820E+00 | -2.157767E+01 |
| 35 | 0.000000E+00 | 1.178790E-02 | -1.716040E+00 | 6.402614E+00 | -1.639958E+01 |
| 36 | 0.000000E+00 | 4.647397E-02 | -2.366260E+00 | 8.494905E+00 | -1.734453E+01 |
| 45 | 0.000000E+00 | 1.181109E-01 | -1.995236E+00 | 5.581240E+00 | -7.968937E+00 |
| 46 | 0.000000E+00 | 1.230712E-01 | -7.465310E-01 | 1.213596E+00 | -6.128903E-01 |
| 55 | 0.000000E+00 | 3.081842E-01 | -4.167783E-01 | 8.512068E-01 | -1.757611E+00 |
| 56 | -2.507262E+00 | 3.516320E-01 | -1.192931E+00 | 2.914862E+00 | -4.763001E+00 |
| 65 | -5.264861E+01 | 6.110387E-02 | -6.253833E-01 | 1.215214E+00 | -1.507987E+00 |
| 66 | -6.864819E+00 | -8.784855E-02 | 8.792536E-03 | 2.889694E-02 | -3.129805E-02 |
| Surface | $a_{12}$ | $a_{14}$ | $a_{16}$ | $a_{18}$ | $a_{20}$ |
| 15 | 2.071767E-01 | -7.383893E-02 | 1.463717E-02 | 0.000000E+00 | 0.000000E+00 |
| 16 | -2.051433E+01 | 2.270320E+01 | -1.229752E+01 | 0.000000E+00 | 0.000000E+00 |
| 25 | -4.312002E+00 | 3.354665E+00 | -7.848853E+00 | 0.000000E+00 | 0.000000E+00 |
| 26 | 4.435107E+01 | -4.485742E+01 | 1.612044E+01 | 0.000000E+00 | 0.000000E+00 |
| 35 | 2.383655E+01 | -1.367244E+01 | 1.295736E+00 | 0.000000E+00 | 0.000000E+00 |
| 36 | 2.140695E+01 | -1.502473E+01 | 5.520754E+00 | 0.000000E+00 | 0.000000E+00 |
| 45 | 5.410750E+00 | -7.408210E-01 | -8.151308E-01 | 0.000000E+00 | 0.000000E+00 |
| 46 | -7.162637E-01 | 1.193371E+00 | -6.355687E-01 | 1.171434E-01 | 0.000000E+00 |
| 55 | 2.538211E+00 | -2.173885E+00 | 1.004945E+00 | -1.958968E-01 | 0.000000E+00 |
| 56 | 5.268507E+00 | -3.846744E+00 | 1.763032E+00 | -4.560887E-01 | 5.042993E-02 |
| 65 | 1.230705E+00 | -6.476607E-01 | 2.084233E-01 | -3.658211E-02 | 2.623974E-03 |
| 66 | 1.662377E-02 | -5.278680E-03 | 1.008456E-03 | -1.075681E-04 | 4.955220E-06 |

FIG. 13

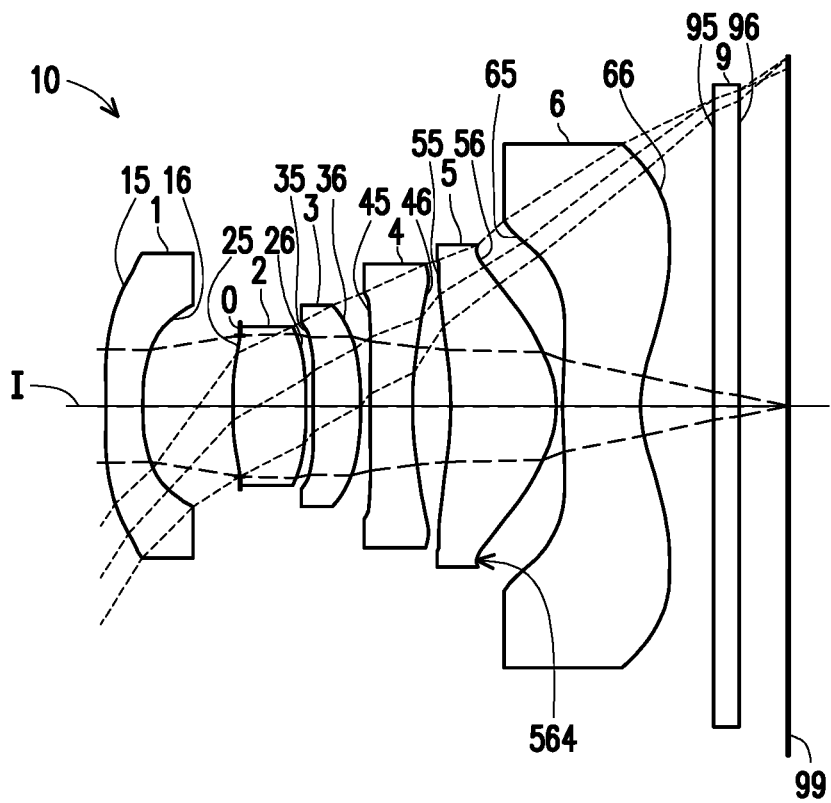
FIG. 14
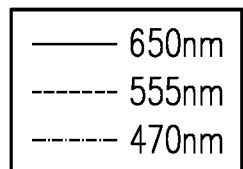
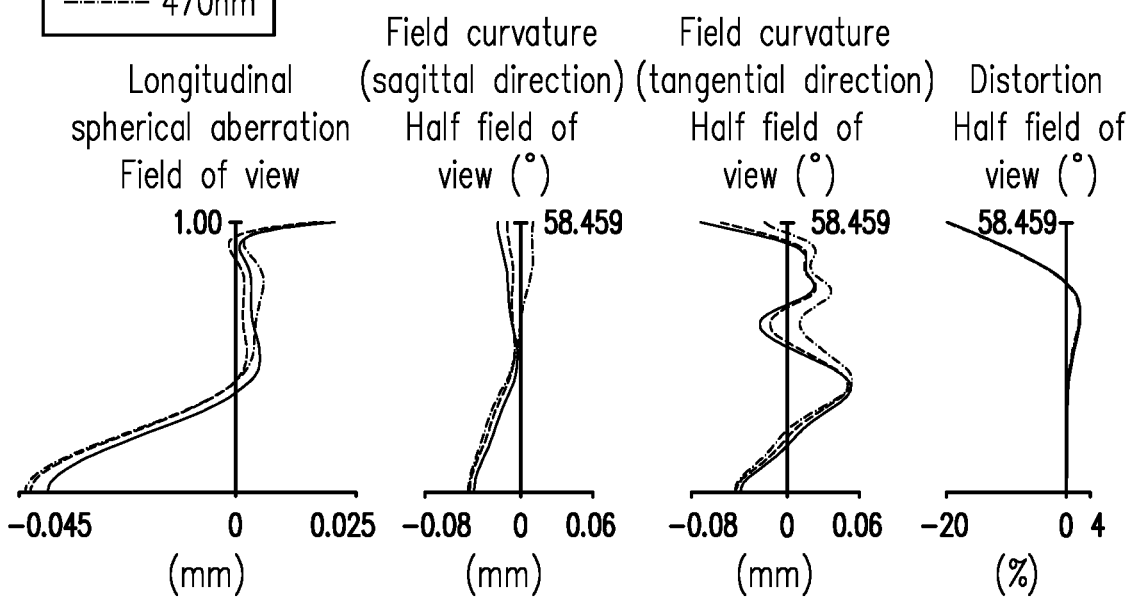
FIG. 15A   FIG. 15B   FIG. 15C   FIG. 15D

| Third embodiment | | | | | | |
|---|---|---|---|---|---|---|
| TTL=5.600 mm, EFL=2.173 mm, HFOV=58.459°, image height=2.880 mm, Fno=2.250 | | | | | | |
| Element | Surface | Radius(mm) | Distance (mm) | Refractive index | Abbe number | Focal length(mm) |
| Object | | Infinity | Infinity | | | |
| First lens element 1 | Object-side surface 15 | -13.664 | 0.301 | 1.545 | 55.987 | -4.160 |
| | Image-side surface 16 | 2.747 | 0.785 | | | |
| Aperture 0 | | Infinity | -0.045 | | | |
| Second lens element 2 | Object-side surface 25 | 3.183 | 0.600 | 1.545 | 55.987 | 2.849 |
| | Image-side surface 26 | -2.842 | 0.059 | | | |
| Third lens element 3 | Object-side surface 35 | -49.970 | 0.390 | 1.545 | 55.987 | 5.583 |
| | Image-side surface 36 | -2.882 | 0.076 | | | |
| Fourth lens element 4 | Object-side surface 45 | 5.802 | 0.349 | 1.661 | 20.412 | -9.500 |
| | Image-side surface 46 | 2.956 | 0.318 | | | |
| Fifth lens element 5 | Object-side surface 55 | -2.484 | 0.866 | 1.545 | 55.987 | 1.736 |
| | Image-side surface 56 | -0.771 | 0.050 | | | |
| Sixth lens element 6 | Object-side surface 65 | 5.230 | 0.641 | 1.642 | 22.409 | -1.902 |
| | Image-side surface 66 | 0.949 | 0.600 | | | |
| Filter 9 | Object-side surface 95 | Infinity | 0.210 | 1.517 | 64.167 | |
| | Image-side surface 96 | Infinity | 0.401 | | | |
| | Image plane 99 | Infinity | | | | |

FIG. 16

| Surface | K | $a_4$ | $a_6$ | $a_8$ | $a_{10}$ |
|---|---|---|---|---|---|
| 15 | 0.000000E+00 | 3.947993E-01 | -4.256878E-01 | 4.652785E-01 | -3.838795E-01 |
| 16 | 9.634970E+00 | 5.465191E-01 | -2.730271E-01 | -1.291452E+00 | 8.606708E+00 |
| 25 | -6.500929E-01 | 5.875003E-02 | 1.685696E-01 | -1.106768E+00 | 3.007197E+00 |
| 26 | 0.000000E+00 | -4.292216E-02 | -1.607684E+00 | 8.366457E+00 | -2.491703E+01 |
| 35 | 0.000000E+00 | -1.182352E-01 | -1.636943E+00 | 5.769910E+00 | -1.336271E+01 |
| 36 | 0.000000E+00 | 1.584654E-02 | -2.423528E+00 | 9.556270E+00 | -1.931191E+01 |
| 45 | 0.000000E+00 | -5.548067E-02 | -1.577587E+00 | 5.610483E+00 | -8.275073E+00 |
| 46 | 0.000000E+00 | 4.000097E-02 | -5.528557E-01 | 1.099278E+00 | -6.275762E-01 |
| 55 | 0.000000E+00 | 2.363584E-01 | -3.785753E-01 | 8.208418E-01 | -1.742731E+00 |
| 56 | -2.096248E+00 | 2.774028E-01 | -1.183260E+00 | 2.893332E+00 | -4.760841E+00 |
| 65 | -1.341170E+02 | 7.453840E-02 | -6.400495E-01 | 1.219467E+00 | -1.513461E+00 |
| 66 | -6.575055E+00 | -9.863026E-02 | 2.351299E-02 | 2.150032E-02 | -2.930593E-02 |
| Surface | $a_{12}$ | $a_{14}$ | $a_{16}$ | $a_{18}$ | $a_{20}$ |
| 15 | 2.086933E-01 | -7.373321E-02 | 1.258447E-02 | 0.000000E+00 | 0.000000E+00 |
| 16 | -2.026236E+01 | 2.339824E+01 | -1.112169E+01 | 0.000000E+00 | 0.000000E+00 |
| 25 | -3.445781E+00 | 3.093837E+00 | -5.251737E+00 | 0.000000E+00 | 0.000000E+00 |
| 26 | 4.242617E+01 | -4.005194E+01 | 1.736761E+01 | 0.000000E+00 | 0.000000E+00 |
| 35 | 1.863589E+01 | -1.898837E+01 | 1.151550E+01 | 0.000000E+00 | 0.000000E+00 |
| 36 | 2.127884E+01 | -1.237279E+01 | 2.943297E+00 | 0.000000E+00 | 0.000000E+00 |
| 45 | 4.957655E+00 | 7.905868E-02 | -9.431107E-01 | 0.000000E+00 | 0.000000E+00 |
| 46 | -6.735099E-01 | 1.196282E+00 | -6.506586E-01 | 1.211858E-01 | 0.000000E+00 |
| 55 | 2.542298E+00 | -2.176700E+00 | 1.001149E+00 | -1.928209E-01 | 0.000000E+00 |
| 56 | 5.270005E+00 | -3.846359E+00 | 1.764303E+00 | -4.556575E-01 | 5.012732E-02 |
| 65 | 1.229843E+00 | -6.468206E-01 | 2.085529E-01 | -3.656858E-02 | 2.612847E-03 |
| 66 | 1.644210E-02 | -5.306780E-03 | 1.012616E-03 | -1.062370E-04 | 4.739419E-06 |

FIG. 17

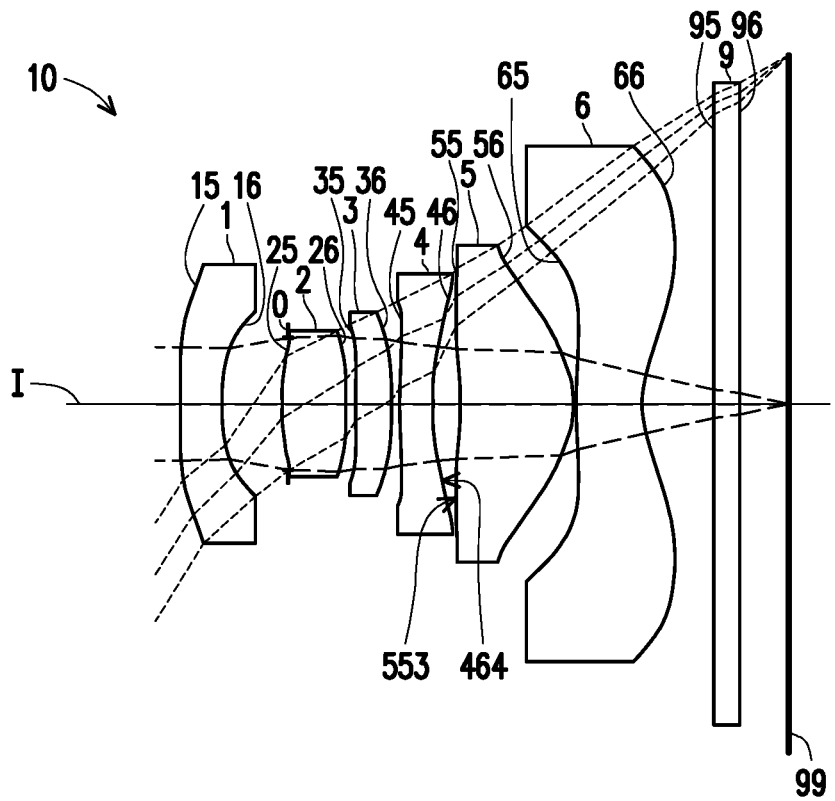
FIG. 18
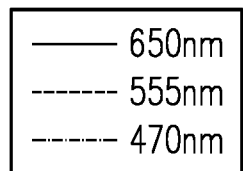
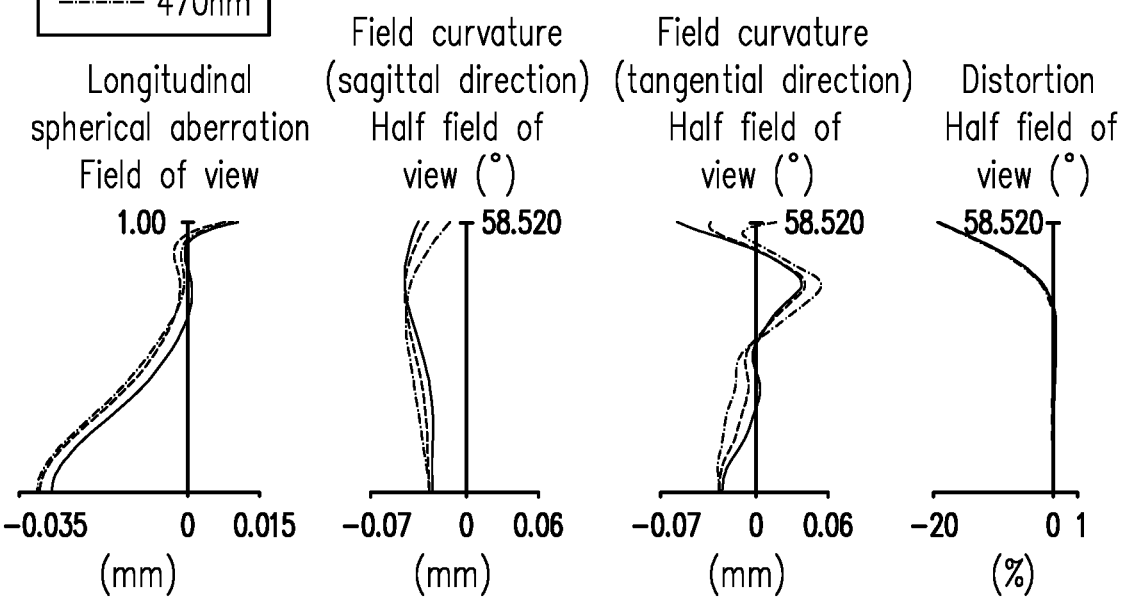
FIG. 19A   FIG. 19B   FIG. 19C   FIG. 19D

| Fourth embodiment | | | | | | |
|---|---|---|---|---|---|---|
| TTL=5.014 mm, EFL=2.157 mm, HFOV=58.520°, image height=2.880 mm, Fno=2.250 | | | | | | |
| Element | Surface | Radius(mm) | Distance (mm) | Refractive index | Abbe number | Focal length(mm) |
| Object | | Infinity | Infinity | | | |
| First lens element 1 | Object-side surface 15 | -13.442 | 0.342 | 1.545 | 55.987 | -4.319 |
| | Image-side surface 16 | 2.888 | 0.544 | | | |
| Aperture 0 | | Infinity | -0.047 | | | |
| Second lens element 2 | Object-side surface 25 | 2.497 | 0.526 | 1.545 | 55.987 | 2.868 |
| | Image-side surface 26 | -3.892 | 0.082 | | | |
| Third lens element 3 | Object-side surface 35 | -31.740 | 0.299 | 1.561 | 41.061 | 5.473 |
| | Image-side surface 36 | -2.822 | 0.060 | | | |
| Fourth lens element 4 | Object-side surface 45 | 4.091 | 0.277 | 1.661 | 20.412 | -9.684 |
| | Image-side surface 46 | 2.437 | 0.222 | | | |
| Fifth lens element 5 | Object-side surface 55 | -3.676 | 0.938 | 1.545 | 55.987 | 1.530 |
| | Image-side surface 56 | -0.742 | 0.019 | | | |
| Sixth lens element 6 | Object-side surface 65 | 3.882 | 0.541 | 1.618 | 19.981 | -1.690 |
| | Image-side surface 66 | 0.785 | 0.600 | | | |
| Filter 9 | Object-side surface 95 | Infinity | 0.210 | 1.517 | 64.167 | |
| | Image-side surface 96 | Infinity | 0.401 | | | |
| | Image plane 99 | Infinity | | | | |

FIG. 20

| Surface | K | $a_4$ | $a_6$ | $a_8$ | $a_{10}$ |
|---|---|---|---|---|---|
| 15 | 0.000000E+00 | 3.810048E-01 | -4.304770E-01 | 4.620691E-01 | -3.855426E-01 |
| 16 | 1.163167E+01 | 5.822022E-01 | -2.945017E-01 | -1.327132E+00 | 8.487595E+00 |
| 25 | -3.198916E-01 | 5.943947E-02 | 7.339656E-02 | -1.308955E+00 | 3.297895E+00 |
| 26 | 0.000000E+00 | -2.969578E-02 | -1.345863E+00 | 6.015294E+00 | -2.172236E+01 |
| 35 | 0.000000E+00 | 5.385179E-02 | -1.680992E+00 | 5.937268E+00 | -1.614544E+01 |
| 36 | 0.000000E+00 | 2.033810E-01 | -2.481757E+00 | 8.660718E+00 | -1.750558E+01 |
| 45 | 0.000000E+00 | 9.156363E-02 | -1.950561E+00 | 5.528175E+00 | -7.805503E+00 |
| 46 | 0.000000E+00 | 1.036180E-01 | -7.322919E-01 | 1.227252E+00 | -6.208344E-01 |
| 55 | 0.000000E+00 | 2.437996E-01 | -3.876470E-01 | 8.502155E-01 | -1.764890E+00 |
| 56 | -2.534924E+00 | 2.504771E-01 | -1.180909E+00 | 2.919298E+00 | -4.762919E+00 |
| 65 | -8.579301E+01 | 5.424797E-02 | -6.323891E-01 | 1.216938E+00 | -1.507751E+00 |
| 66 | -5.917099E+00 | -9.583366E-02 | 1.326597E-02 | 2.844434E-02 | -3.132485E-02 |
| Surface | $a_{12}$ | $a_{14}$ | $a_{16}$ | $a_{18}$ | $a_{20}$ |
| 15 | 2.062639E-01 | -7.420212E-02 | 1.411049E-02 | 0.000000E+00 | 0.000000E+00 |
| 16 | -2.042081E+01 | 2.337509E+01 | -1.238239E+01 | 0.000000E+00 | 0.000000E+00 |
| 25 | -4.711300E+00 | 3.630606E-02 | -2.601767E+00 | 0.000000E+00 | 0.000000E+00 |
| 26 | 4.305989E+01 | -4.285656E+01 | 1.496429E+01 | 0.000000E+00 | 0.000000E+00 |
| 35 | 2.411449E+01 | -1.383183E+01 | 1.150193E+00 | 0.000000E+00 | 0.000000E+00 |
| 36 | 2.131916E+01 | -1.433671E+01 | 4.706916E+00 | 0.000000E+00 | 0.000000E+00 |
| 45 | 5.345452E+00 | -1.150591E+00 | -3.836732E-01 | 0.000000E+00 | 0.000000E+00 |
| 46 | -7.206685E-01 | 1.196252E+00 | -6.329083E-01 | 1.174630E-01 | 0.000000E+00 |
| 55 | 2.533292E+00 | -2.175345E+00 | 1.006017E+00 | -1.937488E-01 | 0.000000E+00 |
| 56 | 5.267926E+00 | -3.847261E+00 | 1.762728E+00 | -4.561354E-01 | 5.062986E-02 |
| 65 | 1.230455E+00 | -6.478128E-01 | 2.083885E-01 | -3.657202E-02 | 2.638395E-03 |
| 66 | 1.663072E-02 | -5.276210E-03 | 1.008908E-03 | -1.075426E-04 | 4.928068E-06 |

FIG. 21

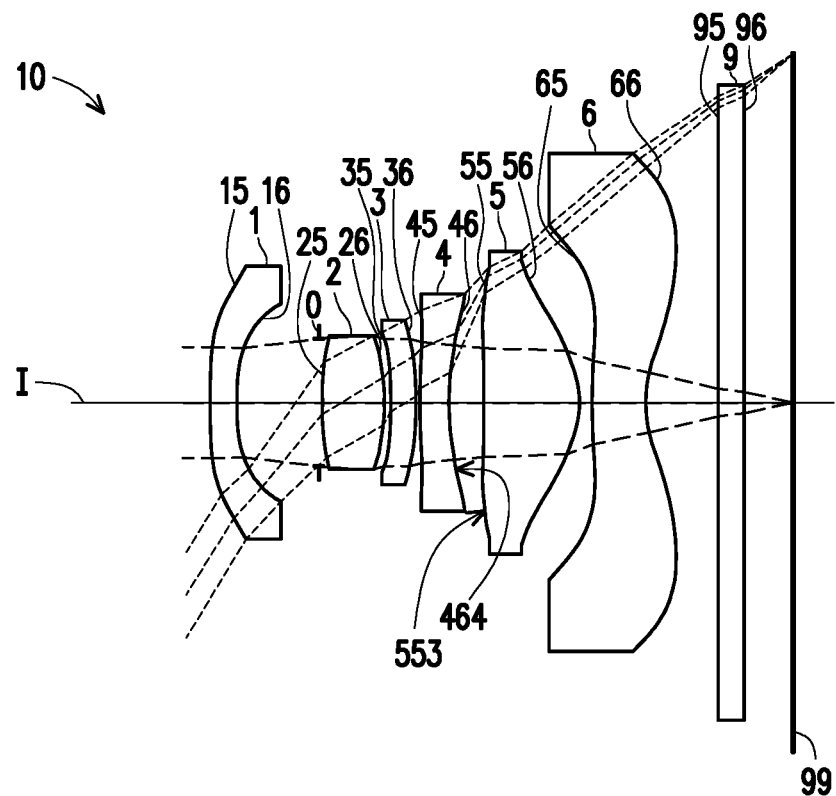
FIG. 22
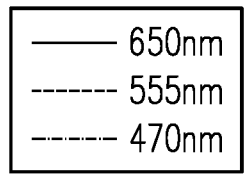
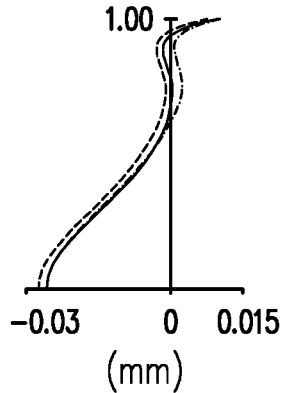
FIG. 23A
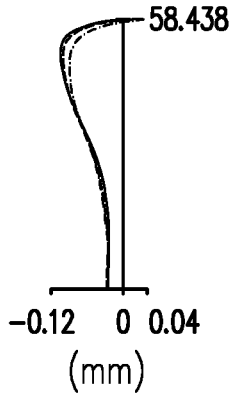
FIG. 23B
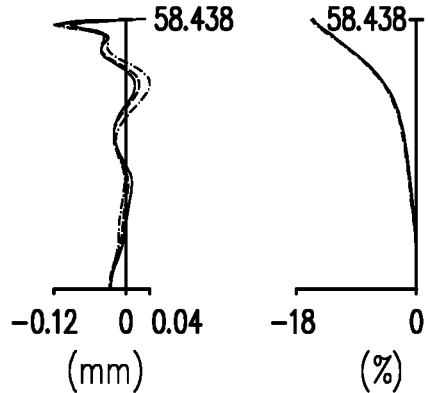
FIG. 23C
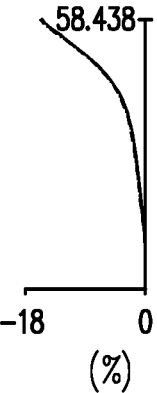
FIG. 23D

| Fifth embodiment |||||||
|---|---|---|---|---|---|---|
| TTL=4.790 mm, EFL=2.117 mm, HFOV=58.438°, image height=2.880 mm, Fno=2.250 |||||||
| Element | Surface | Radius(mm) | Distance (mm) | Refractive index | Abbe number | Focal length(mm) |
| Object | | Infinity | Infinity | | | |
| First lens element 1 | Object-side surface 15 | -93.434 | 0.216 | 1.545 | 55.987 | -5.493 |
| | Image-side surface 16 | 3.103 | 0.672 | | | |
| Aperture 0 | | Infinity | 0.033 | | | |
| Second lens element 2 | Object-side surface 25 | 2.601 | 0.507 | 1.545 | 55.987 | 2.139 |
| | Image-side surface 26 | -1.976 | 0.056 | | | |
| Third lens element 3 | Object-side surface 35 | -3.206 | 0.207 | 1.545 | 55.987 | -278.065 |
| | Image-side surface 36 | -3.350 | 0.035 | | | |
| Fourth lens element 4 | Object-side surface 45 | 5.033 | 0.238 | 1.661 | 20.412 | -8.325 |
| | Image-side surface 46 | 2.590 | 0.287 | | | |
| Fifth lens element 5 | Object-side surface 55 | -6.159 | 0.784 | 1.545 | 55.987 | 1.534 |
| | Image-side surface 56 | -0.771 | 0.106 | | | |
| Sixth lens element 6 | Object-side surface 65 | 3.897 | 0.439 | 1.642 | 22.409 | -1.763 |
| | Image-side surface 66 | 0.844 | 0.600 | | | |
| Filter 9 | Object-side surface 95 | Infinity | 0.210 | 1.517 | 64.167 | |
| | Image-side surface 96 | Infinity | 0.401 | | | |
| | Image plane 99 | Infinity | | | | |

FIG. 24

| Surface | K | $a_4$ | $a_6$ | $a_8$ | $a_{10}$ |
|---|---|---|---|---|---|
| 15 | 0.000000E+00 | 4.377428E-01 | -4.565334E-01 | 4.924320E-01 | -3.943127E-01 |
| 16 | 1.163167E+01 | 5.655256E-01 | -2.362477E-01 | -1.372830E+00 | 8.552118E+00 |
| 25 | -3.198916E-01 | -1.092926E-03 | 6.515380E-02 | -9.209348E-01 | 2.036758E+00 |
| 26 | 0.000000E+00 | 1.039300E-01 | -1.464366E+00 | 6.023897E+00 | -2.189430E+01 |
| 35 | 0.000000E+00 | 1.337689E-01 | -1.748726E+00 | 5.915748E+00 | -1.647832E+01 |
| 36 | 0.000000E+00 | 1.057579E-01 | -2.172150E+00 | 8.300209E+00 | -1.744327E+01 |
| 45 | 0.000000E+00 | 8.026614E-02 | -1.738863E+00 | 5.305523E+00 | -7.915732E+00 |
| 46 | 0.000000E+00 | 1.319143E-01 | -7.289143E-01 | 1.183247E+00 | -5.819729E-01 |
| 55 | 0.000000E+00 | 2.175613E-01 | -3.529846E-01 | 8.244979E-01 | -1.755784E+00 |
| 56 | -2.534924E+00 | 2.767263E-01 | -1.179548E+00 | 2.904426E+00 | -4.740121E+00 |
| 65 | -8.579301E+01 | 6.776545E-02 | -6.518662E-01 | 1.238775E+00 | -1.521191E+00 |
| 66 | -5.917099E+00 | -1.046083E-01 | 1.705640E-02 | 2.677485E-02 | -3.090339E-02 |
| Surface | $a_{12}$ | $a_{14}$ | $a_{16}$ | $a_{18}$ | $a_{20}$ |
| 15 | 2.084241E-01 | -8.039405E-02 | 1.584905E-02 | 0.000000E+00 | 0.000000E+00 |
| 16 | -2.036189E+01 | 2.399936E+01 | -1.171537E+01 | 0.000000E+00 | 0.000000E+00 |
| 25 | -3.682099E+00 | 1.893759E+00 | -7.432698E+00 | 0.000000E+00 | 0.000000E+00 |
| 26 | 4.320535E+01 | -4.227775E+01 | 1.410637E+01 | 0.000000E+00 | 0.000000E+00 |
| 35 | 2.459023E+01 | -1.308040E+01 | 5.267401E-01 | 0.000000E+00 | 0.000000E+00 |
| 36 | 2.166743E+01 | -1.490378E+01 | 4.627108E+00 | 0.000000E+00 | 0.000000E+00 |
| 45 | 5.673928E+00 | -1.220513E+00 | -5.732362E-01 | 0.000000E+00 | 0.000000E+00 |
| 46 | -7.298912E-01 | 1.188087E+00 | -6.465980E-01 | 1.260695E-01 | 0.000000E+00 |
| 55 | 2.525490E+00 | -2.169933E+00 | 1.008581E+00 | -1.959295E-01 | 0.000000E+00 |
| 56 | 5.263012E+00 | -3.846102E+00 | 1.763456E+00 | -4.567764E-01 | 5.045564E-02 |
| 65 | 1.236040E+00 | -6.484824E-01 | 2.079324E-01 | -3.639615E-02 | 2.618481E-03 |
| 66 | 1.657902E-02 | -5.286532E-03 | 1.011946E-03 | -1.069918E-04 | 4.781553E-06 |

FIG. 25

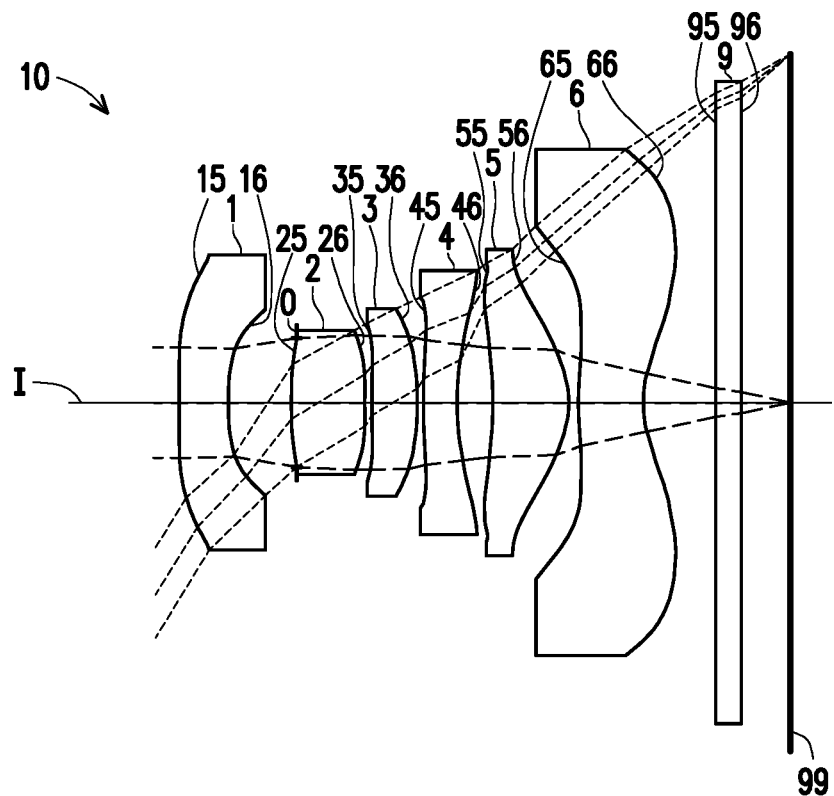
FIG. 26
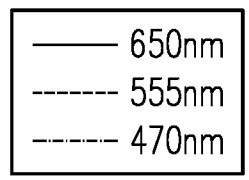
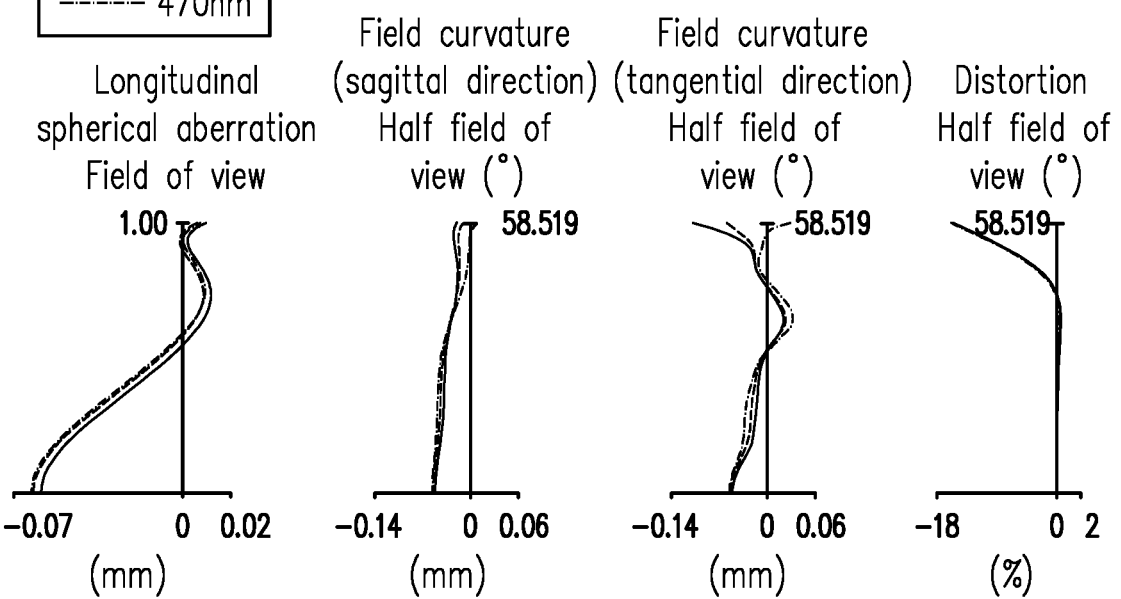
FIG. 27A   FIG. 27B   FIG. 27C   FIG. 27D

| Sixth embodiment ||||||
|---|---|---|---|---|---|
| TTL=5.035 mm, EFL=2.086 mm, HFOV=58.519°, image height=2.880 mm, Fno=2.250 ||||||
| Element | Surface | Radius(mm) | Distance (mm) | Refractive index | Abbe number | Focal length(mm) |
| Object |  | Infinity | Infinity |  |  |  |
| First lens element 1 | Object-side surface 15 | -10.545 | 0.403 | 1.545 | 55.987 | -4.111 |
|  | Image-side surface 16 | 2.892 | 0.557 |  |  |  |
| Aperture 0 |  | Infinity | -0.039 |  |  |  |
| Second lens element 2 | Object-side surface 25 | 2.988 | 0.609 | 1.545 | 55.987 | 2.960 |
|  | Image-side surface 26 | -3.271 | 0.061 |  |  |  |
| Third lens element 3 | Object-side surface 35 | -93.553 | 0.368 | 1.545 | 55.987 | 5.262 |
|  | Image-side surface 36 | -2.793 | 0.051 |  |  |  |
| Fourth lens element 4 | Object-side surface 45 | 4.048 | 0.280 | 1.661 | 20.412 | -10.109 |
|  | Image-side surface 46 | 2.460 | 0.270 |  |  |  |
| Fifth lens element 5 | Object-side surface 55 | -3.443 | 0.650 | 1.545 | 55.987 | 1.602 |
|  | Image-side surface 56 | -0.744 | 0.080 |  |  |  |
| Sixth lens element 6 | Object-side surface 65 | 4.143 | 0.535 | 1.642 | 22.409 | -1.655 |
|  | Image-side surface 66 | 0.808 | 0.600 |  |  |  |
| Filter 9 | Object-side surface 95 | Infinity | 0.210 | 1.517 | 64.167 |  |
|  | Image-side surface 96 | Infinity | 0.401 |  |  |  |
|  | Image plane 99 | Infinity |  |  |  |  |

FIG. 28

| Surface | K | $a_4$ | $a_6$ | $a_8$ | $a_{10}$ |
|---|---|---|---|---|---|
| 15 | 0.000000E+00 | 3.804417E-01 | -4.231612E-01 | 4.678412E-01 | -3.814948E-01 |
| 16 | 1.163167E+01 | 6.262570E-01 | -3.702015E-01 | -1.198027E+00 | 8.741955E+00 |
| 25 | -3.198916E-01 | 2.304278E-02 | 9.085358E-02 | -1.276003E+00 | 3.293279E+00 |
| 26 | 0.000000E+00 | -1.320319E-03 | -1.359877E+00 | 6.073466E+00 | -2.159116E+01 |
| 35 | 0.000000E+00 | 5.736573E-02 | -1.656400E+00 | 5.928345E+00 | -1.618264E+01 |
| 36 | 0.000000E+00 | 1.427773E-01 | -2.509134E+00 | 8.641516E+00 | -1.754834E+01 |
| 45 | 0.000000E+00 | 1.109968E-01 | -1.968755E+00 | 5.515994E+00 | -7.792795E+00 |
| 46 | 0.000000E+00 | 1.104556E-01 | -7.257054E-01 | 1.226454E+00 | -6.238904E-01 |
| 55 | 0.000000E+00 | 2.330463E-01 | -3.787568E-01 | 8.523585E-01 | -1.765325E+00 |
| 56 | -2.534924E+00 | 2.859786E-01 | -1.164237E+00 | 2.919519E+00 | -4.763399E+00 |
| 65 | -8.579301E+01 | 6.306521E-02 | -6.399894E-01 | 1.219312E+00 | -1.506964E+00 |
| 66 | -5.917099E+00 | -9.902773E-02 | 1.367931E-02 | 2.825375E-02 | -3.133789E-02 |
| Surface | $a_{12}$ | $a_{14}$ | $a_{16}$ | $a_{18}$ | $a_{20}$ |
| 15 | 2.079796E-01 | -7.449700E-02 | 1.256297E-02 | 0.000000E+00 | 0.000000E+00 |
| 16 | -2.027362E+01 | 2.313334E+01 | -1.323106E+01 | 0.000000E+00 | 0.000000E+00 |
| 25 | -4.841992E+00 | -1.194035E-01 | -8.144644E-01 | 0.000000E+00 | 0.000000E+00 |
| 26 | 4.323034E+01 | -4.264715E+01 | 1.537642E+01 | 0.000000E+00 | 0.000000E+00 |
| 35 | 2.407068E+01 | -1.387866E+01 | 1.133894E+00 | 0.000000E+00 | 0.000000E+00 |
| 36 | 2.124481E+01 | -1.442017E+01 | 4.669828E+00 | 0.000000E+00 | 0.000000E+00 |
| 45 | 5.373478E+00 | -1.130805E+00 | -4.218068E-01 | 0.000000E+00 | 0.000000E+00 |
| 46 | -7.232027E-01 | 1.194822E+00 | -6.334646E-01 | 1.173298E-01 | 0.000000E+00 |
| 55 | 2.533184E+00 | -2.175311E+00 | 1.005836E+00 | -1.941732E-01 | 0.000000E+00 |
| 56 | 5.267905E+00 | -3.847230E+00 | 1.762715E+00 | -4.561674E-01 | 5.060466E-02 |
| 65 | 1.230526E+00 | -6.478407E-01 | 2.083740E-01 | -3.657415E-02 | 2.639950E-03 |
| 66 | 1.663185E-02 | -5.275751E-03 | 1.008971E-03 | -1.075469E-04 | 4.921752E-06 |

FIG. 29

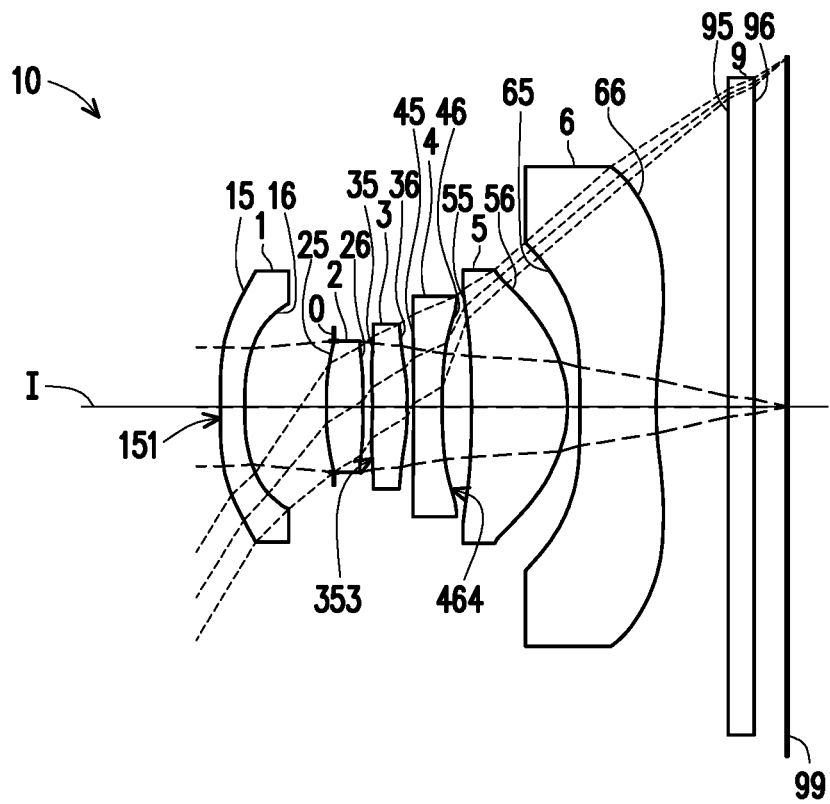
FIG. 30
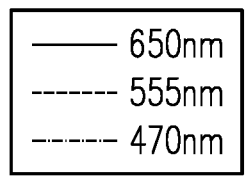
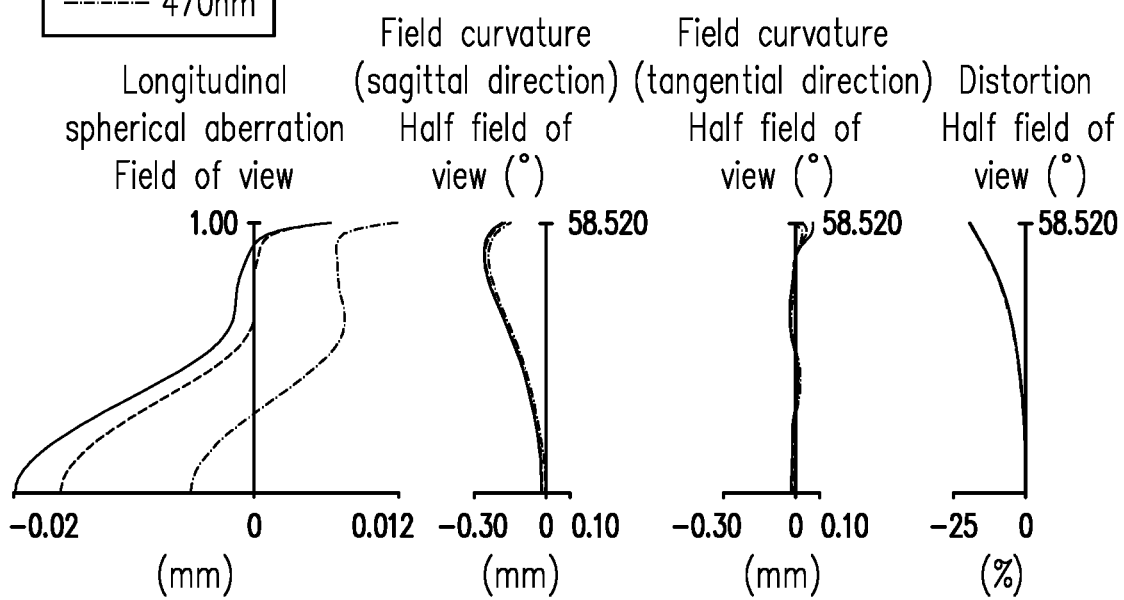
FIG. 31A    FIG. 31B    FIG. 31C    FIG. 31D

| Seventh embodiment | | | | | | |
|---|---|---|---|---|---|---|
| TTL=4.673 mm, EFL=2.285 mm, HFOV=58.520°, image height=2.880 mm, Fno=2.250 | | | | | | |
| Element | Surface | Radius(mm) | Distance (mm) | Refractive index | Abbe number | Focal length(mm) |
| Object | | Infinity | Infinity | | | |
| First lens element 1 | Object-side surface 15 | 8.144 | 0.201 | 1.545 | 55.987 | -9.409 |
| | Image-side surface 16 | 3.124 | 0.734 | | | |
| Aperture 0 | | Infinity | -0.062 | | | |
| Second lens element 2 | Object-side surface 25 | 2.639 | 0.298 | 1.545 | 55.987 | 3.085 |
| | Image-side surface 26 | -4.477 | 0.082 | | | |
| Third lens element 3 | Object-side surface 35 | -49.491 | 0.287 | 1.545 | 55.987 | 3.993 |
| | Image-side surface 36 | -2.094 | 0.052 | | | |
| Fourth lens element 4 | Object-side surface 45 | 20.117 | 0.233 | 1.661 | 20.412 | -4.395 |
| | Image-side surface 46 | 2.547 | 0.247 | | | |
| Fifth lens element 5 | Object-side surface 55 | -6.186 | 0.789 | 1.545 | 55.987 | 2.150 |
| | Image-side surface 56 | -1.032 | 0.103 | | | |
| Sixth lens element 6 | Object-side surface 65 | -9.420 | 0.629 | 1.642 | 22.409 | -3.183 |
| | Image-side surface 66 | 2.707 | 0.600 | | | |
| Filter 9 | Object-side surface 95 | Infinity | 0.210 | 1.517 | 64.167 | |
| | Image-side surface 96 | Infinity | 0.270 | | | |
| | Image plane 99 | Infinity | | | | |

FIG. 32

| Surface | K | $a_4$ | $a_6$ | $a_8$ | $a_{10}$ |
|---|---|---|---|---|---|
| 15 | 0.000000E+00 | 2.706103E-01 | -1.811528E-01 | 1.917525E-01 | -1.895812E-01 |
| 16 | 1.163167E+01 | 3.586308E-01 | 1.179316E-02 | -1.008078E+00 | 4.758769E+00 |
| 25 | -3.198916E-01 | 6.912663E-02 | 2.470020E-01 | -1.270399E+00 | 8.576972E+00 |
| 26 | 0.000000E+00 | 1.408915E-01 | -4.152835E-01 | 2.185293E+00 | -1.017797E+01 |
| 35 | 0.000000E+00 | 2.208754E-01 | -6.959877E-01 | 2.814758E+00 | -8.658570E+00 |
| 36 | 0.000000E+00 | 4.544496E-01 | -2.162408E+00 | 7.677068E+00 | -1.430431E+01 |
| 45 | 0.000000E+00 | 2.144639E-01 | -1.790702E+00 | 5.473873E+00 | -8.931010E+00 |
| 46 | 0.000000E+00 | 3.015467E-03 | -3.420317E-01 | 7.480926E-01 | -5.327892E-01 |
| 55 | 0.000000E+00 | 6.668823E-02 | -2.898389E-01 | 7.872001E-01 | -1.742099E+00 |
| 56 | -2.534924E+00 | 4.351736E-02 | -8.483299E-01 | 2.422744E+00 | -4.405322E+00 |
| 65 | -8.579301E+01 | -1.039384E-02 | -5.890405E-01 | 1.277104E+00 | -1.606674E+00 |
| 66 | -5.917099E+00 | -1.560388E-01 | 6.366919E-02 | 3.164421E-03 | -2.513668E-02 |
| Surface | $a_{12}$ | $a_{14}$ | $a_{16}$ | $a_{18}$ | $a_{20}$ |
| 15 | 1.597529E-01 | -1.273139E-01 | 4.214800E-02 | 0.000000E+00 | 0.000000E+00 |
| 16 | -9.965578E+00 | 1.101578E+01 | -5.311290E+00 | 0.000000E+00 | 0.000000E+00 |
| 25 | -4.110558E+01 | 1.053922E+02 | -1.073780E+02 | 0.000000E+00 | 0.000000E+00 |
| 26 | 2.550585E+01 | -3.465372E+01 | 1.942591E+01 | 0.000000E+00 | 0.000000E+00 |
| 35 | 1.476347E+01 | -1.492208E+01 | 6.563004E+00 | 0.000000E+00 | 0.000000E+00 |
| 36 | 1.424972E+01 | -7.449685E+00 | 1.909378E+00 | 0.000000E+00 | 0.000000E+00 |
| 45 | 7.304538E+00 | -2.014812E+00 | -5.147812E-01 | 0.000000E+00 | 0.000000E+00 |
| 46 | -4.977464E-01 | 1.121219E+00 | -7.205858E-01 | 1.533253E-01 | 0.000000E+00 |
| 55 | 2.554335E+00 | -2.257435E+00 | 1.154672E+00 | -2.632505E-01 | 0.000000E+00 |
| 56 | 5.207192E+00 | -3.930055E+00 | 1.779576E+00 | -4.242379E-01 | 4.387536E-02 |
| 65 | 1.275032E+00 | -6.450194E-01 | 2.043701E-01 | -3.728404E-02 | 2.982309E-03 |
| 66 | 1.638524E-02 | -5.376457E-03 | 9.688570E-04 | -8.800245E-05 | 2.857469E-06 |

FIG. 33

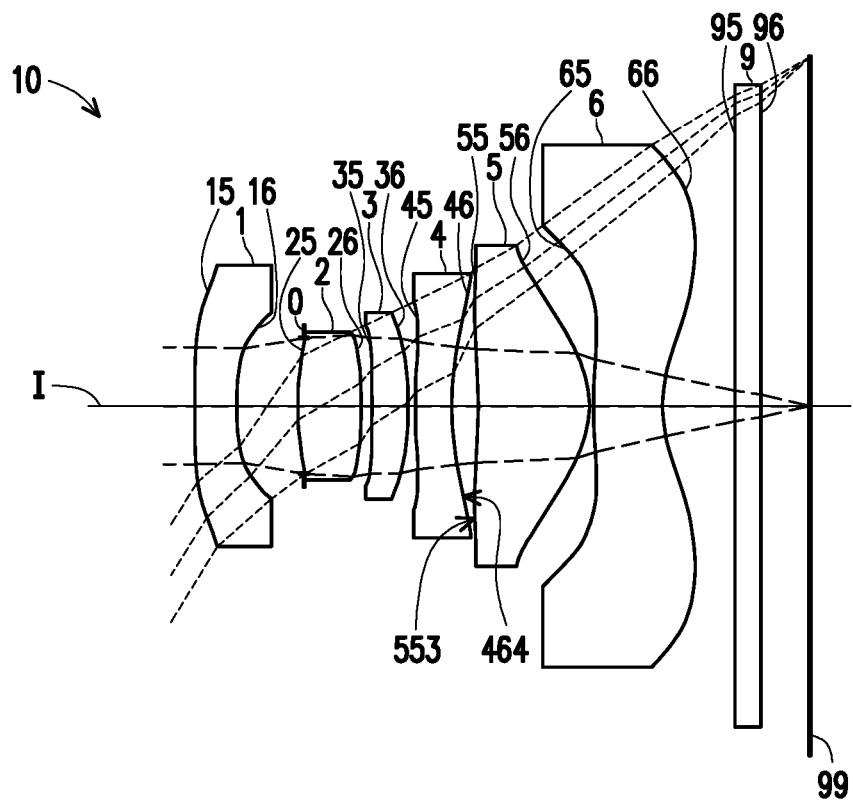
FIG. 34
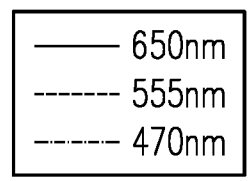
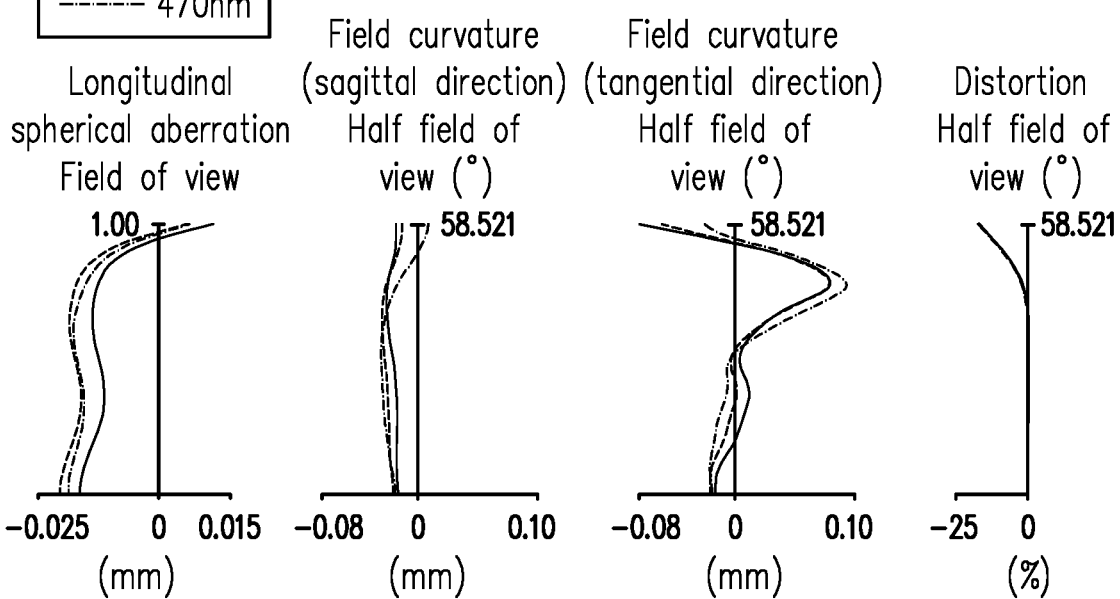
FIG. 35A  FIG. 35B  FIG. 35C  FIG. 35D

| Eighth embodiment | | | | | | |
|---|---|---|---|---|---|---|
| TTL=5.052 mm, EFL=2.202 mm, HFOV=58.521°, image height=2.880 mm, Fno=2.250 | | | | | | |
| Element | Surface | Radius(mm) | Distance (mm) | Refractive index | Abbe number | Focal length(mm) |
| Object | | Infinity | Infinity | | | |
| First lens element 1 | Object-side surface 15 | -12.237 | 0.344 | 1.545 | 55.987 | -4.252 |
| | Image-side surface 16 | 2.896 | 0.548 | | | |
| Aperture 0 | | Infinity | -0.046 | | | |
| Second lens element 2 | Object-side surface 25 | 2.497 | 0.519 | 1.545 | 55.987 | 2.877 |
| | Image-side surface 26 | -3.928 | 0.089 | | | |
| Third lens element 3 | Object-side surface 35 | -38.308 | 0.296 | 1.531 | 49.620 | 5.835 |
| | Image-side surface 36 | -2.885 | 0.059 | | | |
| Fourth lens element 4 | Object-side surface 45 | 4.035 | 0.299 | 1.661 | 20.412 | -10.895 |
| | Image-side surface 46 | 2.518 | 0.222 | | | |
| Fifth lens element 5 | Object-side surface 55 | -3.540 | 0.911 | 1.545 | 55.987 | 1.519 |
| | Image-side surface 56 | -0.733 | 0.036 | | | |
| Sixth lens element 6 | Object-side surface 65 | 4.961 | 0.564 | 1.642 | 22.409 | -1.620 |
| | Image-side surface 66 | 0.827 | 0.600 | | | |
| Filter 9 | Object-side surface 95 | Infinity | 0.210 | 1.517 | 64.167 | |
| | Image-side surface 96 | Infinity | 0.401 | | | |
| | Image plane 99 | Infinity | | | | |

FIG. 36

| Surface | K | $a_4$ | $a_6$ | $a_8$ | $a_{10}$ |
|---|---|---|---|---|---|
| 15 | 0.000000E+00 | 3.799302E-01 | -4.308619E-01 | 4.620504E-01 | -3.855815E-01 |
| 16 | 1.163167E+01 | 5.835777E-01 | -2.927136E-01 | -1.332047E+00 | 8.476734E+00 |
| 25 | -3.198916E-01 | 6.609314E-02 | 6.484038E-02 | -1.348745E+00 | 3.208574E+00 |
| 26 | 0.000000E+00 | -3.139685E-02 | -1.342735E+00 | 6.015727E+00 | -2.172608E+01 |
| 35 | 0.000000E+00 | 5.658437E-02 | -1.685751E+00 | 5.933337E+00 | -1.614511E+01 |
| 36 | 0.000000E+00 | 2.014897E-01 | -2.477393E+00 | 8.663388E+00 | -1.750734E+01 |
| 45 | 0.000000E+00 | 9.971438E-02 | -1.950404E+00 | 5.528290E+00 | -7.804873E+00 |
| 46 | 0.000000E+00 | 1.029526E-01 | -7.313484E-01 | 1.228062E+00 | -6.201987E-01 |
| 55 | 0.000000E+00 | 2.435195E-01 | -3.865312E-01 | 8.514404E-01 | -1.764184E+00 |
| 56 | -2.534924E+00 | 2.590820E-01 | -1.178847E+00 | 2.919780E+00 | -4.762836E+00 |
| 65 | -8.579301E+01 | 5.487200E-02 | -6.317739E-01 | 1.217118E+00 | -1.507706E+00 |
| 66 | -5.917099E+00 | -9.593128E-02 | 1.327223E-02 | 2.845771E-02 | -3.132233E-02 |
| Surface | $a_{12}$ | $a_{14}$ | $a_{16}$ | $a_{18}$ | $a_{20}$ |
| 15 | 2.061955E-01 | -7.425222E-02 | 1.409660E-02 | 0.000000E+00 | 0.000000E+00 |
| 16 | -2.042797E+01 | 2.337321E+01 | -1.239324E+01 | 0.000000E+00 | 0.000000E+00 |
| 25 | -4.815167E+00 | 2.769875E-01 | -2.463492E-01 | 0.000000E+00 | 0.000000E+00 |
| 26 | 4.305590E+01 | -4.284932E+01 | 1.500402E+01 | 0.000000E+00 | 0.000000E+00 |
| 35 | 2.411821E+01 | -1.383013E+01 | 1.145518E+00 | 0.000000E+00 | 0.000000E+00 |
| 36 | 2.131208E+01 | -1.434954E+01 | 4.686811E+00 | 0.000000E+00 | 0.000000E+00 |
| 45 | 5.345034E+00 | -1.153617E+00 | -3.908783E-01 | 0.000000E+00 | 0.000000E+00 |
| 46 | -7.202578E-01 | 1.196381E+00 | -6.330731E-01 | 1.170262E-01 | 0.000000E+00 |
| 55 | 2.533544E+00 | -2.175361E+00 | 1.005882E+00 | -1.939148E-01 | 0.000000E+00 |
| 56 | 5.267918E+00 | -3.847280E+00 | 1.762715E+00 | -4.561426E-01 | 5.062631E-02 |
| 65 | 1.230467E+00 | -6.478097E-01 | 2.083894E-01 | -3.657174E-02 | 2.638470E-03 |
| 66 | 1.663098E-02 | -5.276211E-03 | 1.008900E-03 | -1.075456E-04 | 4.927351E-06 |

FIG. 37

| Ninth embodiment | | | | | | |
|---|---|---|---|---|---|---|
| TTL=4.913 mm, EFL=2.247 mm, HFOV=58.522°, image height=2.880 mm, Fno=2.250 | | | | | | |
| Element | Surface | Radius(mm) | Distance (mm) | Refractive index | Abbe number | Focal length(mm) |
| Object | | Infinity | Infinity | | | |
| First lens element 1 | Object-side surface 15 | -17.174 | 0.318 | 1.545 | 55.987 | -4.544 |
| | Image-side surface 16 | 2.921 | 0.546 | | | |
| Aperture 0 | | Infinity | -0.059 | | | |
| Second lens element 2 | Object-side surface 25 | 2.429 | 0.530 | 1.545 | 55.987 | 2.797 |
| | Image-side surface 26 | -3.802 | 0.074 | | | |
| Third lens element 3 | Object-side surface 35 | -33.759 | 0.307 | 1.545 | 55.987 | 5.276 |
| | Image-side surface 36 | -2.664 | 0.057 | | | |
| Fourth lens element 4 | Object-side surface 45 | 4.713 | 0.267 | 1.661 | 20.412 | -7.724 |
| | Image-side surface 46 | 2.406 | 0.212 | | | |
| Fifth lens element 5 | Object-side surface 55 | -3.646 | 0.827 | 1.545 | 55.987 | 1.522 |
| | Image-side surface 56 | -0.731 | 0.086 | | | |
| Sixth lens element 6 | Object-side surface 65 | 12.728 | 0.534 | 1.582 | 30.186 | -1.578 |
| | Image-side surface 66 | 0.849 | 0.600 | | | |
| Filter 9 | Object-side surface 95 | Infinity | 0.210 | 1.517 | 64.167 | |
| | Image-side surface 96 | Infinity | 0.401 | | | |
| | Image plane 99 | Infinity | | | | |

FIG. 40

| Surface | K | $a_4$ | $a_6$ | $a_8$ | $a_{10}$ |
|---|---|---|---|---|---|
| 15 | 0.000000E+00 | 3.791282E-01 | -4.305123E-01 | 4.620488E-01 | -3.855420E-01 |
| 16 | 1.163167E+01 | 5.854094E-01 | -3.094931E-01 | -1.312473E+00 | 8.531756E+00 |
| 25 | -3.198916E-01 | 5.081054E-02 | 8.429299E-02 | -1.284039E+00 | 3.317481E+00 |
| 26 | 0.000000E+00 | -2.305774E-02 | -1.339601E+00 | 6.029489E+00 | -2.169822E+01 |
| 35 | 0.000000E+00 | 5.136458E-02 | -1.673568E+00 | 5.942797E+00 | -1.614277E+01 |
| 36 | 0.000000E+00 | 2.005145E-01 | -2.485834E+00 | 8.656988E+00 | -1.751086E+01 |
| 45 | 0.000000E+00 | 9.063642E-02 | -1.949680E+00 | 5.529633E+00 | -7.802456E+00 |
| 46 | 0.000000E+00 | 1.059783E-01 | -7.288268E-01 | 1.228486E+00 | -6.209909E-01 |
| 55 | 0.000000E+00 | 2.482086E-01 | -3.864778E-01 | 8.501974E-01 | -1.764717E+00 |
| 56 | -2.534924E+00 | 2.596628E-01 | -1.180438E+00 | 2.920164E+00 | -4.762052E+00 |
| 65 | -8.579301E+01 | 4.471414E-02 | -6.292972E-01 | 1.217902E+00 | -1.507597E+00 |
| 66 | -5.917099E+00 | -9.165413E-02 | 1.233043E-02 | 2.836207E-02 | -3.132075E-02 |
| Surface | $a_{12}$ | $a_{14}$ | $a_{16}$ | $a_{18}$ | $a_{20}$ |
| 15 | 2.063340E-01 | -7.412396E-02 | 1.414499E-02 | 0.000000E+00 | 0.000000E+00 |
| 16 | -2.035696E+01 | 2.343252E+01 | -1.236035E+01 | 0.000000E+00 | 0.000000E+00 |
| 25 | -4.732885E+00 | 4.920273E-02 | -1.665641E+00 | 0.000000E+00 | 0.000000E+00 |
| 26 | 4.309196E+01 | -4.281677E+01 | 1.502372E+01 | 0.000000E+00 | 0.000000E+00 |
| 35 | 2.412012E+01 | -1.384090E+01 | 1.086501E+00 | 0.000000E+00 | 0.000000E+00 |
| 36 | 2.131082E+01 | -1.434645E+01 | 4.704001E+00 | 0.000000E+00 | 0.000000E+00 |
| 45 | 5.346697E+00 | -1.155358E+00 | -4.059128E-01 | 0.000000E+00 | 0.000000E+00 |
| 46 | -7.211995E-01 | 1.195907E+00 | -6.328196E-01 | 1.180671E-01 | 0.000000E+00 |
| 55 | 2.533647E+00 | -2.175006E+00 | 1.006254E+00 | -1.936187E-01 | 0.000000E+00 |
| 56 | 5.268451E+00 | -3.847015E+00 | 1.762825E+00 | -4.561021E-01 | 5.063969E-02 |
| 65 | 1.230474E+00 | -6.478060E-01 | 2.083937E-01 | -3.656876E-02 | 2.640037E-03 |
| 66 | 1.663296E-02 | -5.275962E-03 | 1.008881E-03 | -1.075627E-04 | 4.921749E-06 |

FIG. 41

| Condition expression | First embodiment | Second embodiment | Third embodiment | Fourth embodiment | Fifth embodiment |
|---|---|---|---|---|---|
| T1 | 0.400 | 0.390 | 0.301 | 0.342 | 0.216 |
| G12 | 0.658 | 0.402 | 0.740 | 0.498 | 0.704 |
| T2 | 0.517 | 0.491 | 0.600 | 0.526 | 0.507 |
| G23 | 0.115 | 0.126 | 0.059 | 0.082 | 0.056 |
| T3 | 0.383 | 0.371 | 0.390 | 0.299 | 0.207 |
| G34 | 0.102 | 0.037 | 0.076 | 0.060 | 0.035 |
| T4 | 0.315 | 0.293 | 0.349 | 0.277 | 0.238 |
| G45 | 0.191 | 0.317 | 0.318 | 0.222 | 0.287 |
| T5 | 0.824 | 0.624 | 0.866 | 0.938 | 0.784 |
| G56 | 0.077 | 0.057 | 0.050 | 0.019 | 0.106 |
| T6 | 0.618 | 0.547 | 0.641 | 0.541 | 0.439 |
| G6F | 0.600 | 0.600 | 0.600 | 0.600 | 0.600 |
| TF | 0.210 | 0.210 | 0.210 | 0.210 | 0.210 |
| GFP | 0.401 | 0.401 | 0.401 | 0.401 | 0.401 |
| V1 | 55.987 | 55.987 | 55.987 | 55.987 | 55.987 |
| V2 | 55.987 | 55.987 | 55.987 | 55.987 | 55.987 |
| V3 | 55.987 | 55.987 | 55.987 | 41.061 | 55.987 |
| V4 | 20.412 | 20.412 | 20.412 | 20.412 | 20.412 |
| V5 | 55.987 | 55.987 | 55.987 | 55.987 | 55.987 |
| V6 | 22.409 | 22.409 | 22.409 | 19.981 | 22.409 |
| EFL | 2.115 | 2.497 | 2.173 | 2.157 | 2.117 |
| TL | 4.200 | 3.654 | 4.389 | 3.803 | 3.580 |
| BFL | 1.211 | 1.211 | 1.211 | 1.211 | 1.211 |
| ALT | 3.057 | 2.715 | 3.146 | 2.923 | 2.391 |
| AAG | 1.144 | 0.939 | 1.243 | 0.881 | 1.189 |
| TTL | 5.411 | 4.865 | 5.600 | 5.014 | 4.790 |

FIG. 42

| Condition expression | First embodiment | Second embodiment | Third embodiment | Fourth embodiment | Fifth embodiment |
|---|---|---|---|---|---|
| V3-V6 | 33.578 | 33.578 | 33.578 | 21.081 | 33.578 |
| (T1+G12)/(G23+G34+G56) | 3.602 | 3.602 | 5.628 | 5.206 | 4.658 |
| TTL/(T1+T5) | 4.422 | 4.799 | 4.799 | 3.917 | 4.791 |
| EFL/(T3+G56) | 4.601 | 5.838 | 4.940 | 6.795 | 6.750 |
| AAG/T2 | 2.214 | 1.914 | 2.071 | 1.676 | 2.345 |
| TTL/T5 | 6.571 | 7.799 | 6.469 | 5.343 | 6.112 |
| ALT/(T4+G56) | 7.797 | 7.768 | 7.900 | 9.889 | 6.938 |
| AAG/T4 | 3.627 | 3.211 | 3.564 | 3.182 | 4.989 |
| ALT/(G23+G34+G56) | 10.400 | 12.344 | 17.009 | 18.127 | 12.099 |
| TTL/(T5+T6) | 3.754 | 4.156 | 3.718 | 3.388 | 3.918 |
| TTL/(T4+G56) | 13.802 | 13.920 | 14.061 | 16.965 | 13.900 |
| AAG/G45 | 5.975 | 2.960 | 3.909 | 3.968 | 4.147 |
| EFL/T5 | 2.568 | 4.003 | 2.510 | 2.299 | 2.701 |
| BFL/T3 | 3.161 | 3.265 | 3.102 | 4.053 | 5.842 |
| AAG/T5 | 1.389 | 1.506 | 1.436 | 0.939 | 1.517 |
| (G12+T5)/(G23+G34+G56) | 5.042 | 4.665 | 8.679 | 8.906 | 7.530 |
| TL/(T1+T5) | 3.432 | 3.605 | 3.762 | 2.971 | 3.580 |
| ALT/(T3+G56) | 6.649 | 6.347 | 7.153 | 9.207 | 7.623 |
| TTL/(T2+T6) | 4.769 | 4.689 | 4.514 | 4.699 | 5.065 |
| TL/(T3+T5) | 3.482 | 3.674 | 3.495 | 3.075 | 3.612 |

FIG. 43

| Condition expression | Sixth embodiment | Seventh embodiment | Eighth embodiment | Ninth embodiment |
|---|---|---|---|---|
| T1 | 0.403 | 0.201 | 0.344 | 0.318 |
| G12 | 0.518 | 0.672 | 0.502 | 0.488 |
| T2 | 0.609 | 0.298 | 0.519 | 0.530 |
| G23 | 0.061 | 0.082 | 0.089 | 0.074 |
| T3 | 0.368 | 0.287 | 0.296 | 0.307 |
| G34 | 0.051 | 0.052 | 0.059 | 0.057 |
| T4 | 0.280 | 0.233 | 0.299 | 0.267 |
| G45 | 0.270 | 0.247 | 0.222 | 0.212 |
| T5 | 0.650 | 0.789 | 0.911 | 0.827 |
| G56 | 0.080 | 0.103 | 0.036 | 0.086 |
| T6 | 0.535 | 0.629 | 0.564 | 0.534 |
| G6F | 0.600 | 0.600 | 0.600 | 0.600 |
| TF | 0.210 | 0.210 | 0.210 | 0.210 |
| GFP | 0.401 | 0.270 | 0.401 | 0.401 |
| V1 | 55.987 | 55.987 | 55.987 | 55.987 |
| V2 | 55.987 | 55.987 | 55.987 | 55.987 |
| V3 | 55.987 | 55.987 | 49.620 | 55.987 |
| V4 | 20.412 | 20.412 | 20.412 | 20.412 |
| V5 | 55.987 | 55.987 | 55.987 | 55.987 |
| V6 | 22.409 | 22.409 | 22.409 | 30.186 |
| EFL | 2.086 | 2.285 | 2.202 | 2.247 |
| TL | 3.825 | 3.593 | 3.841 | 3.702 |
| BFL | 1.211 | 1.080 | 1.211 | 1.211 |
| ALT | 2.844 | 2.436 | 2.934 | 2.785 |
| AAG | 0.980 | 1.157 | 0.908 | 0.918 |
| TTL | 5.035 | 4.673 | 5.052 | 4.913 |

FIG. 44

| Condition expression | Sixth embodiment | Seventh embodiment | Eighth embodiment | Ninth embodiment |
|---|---|---|---|---|
| V3-V6 | 33.578 | 33.578 | 27.211 | 25.801 |
| (T1+G12)/(G23+G34+G56) | 4.809 | 3.682 | 4.597 | 3.697 |
| TTL/(T1+T5) | 4.781 | 4.723 | 4.024 | 4.288 |
| EFL/(T3+G56) | 4.657 | 5.854 | 6.625 | 5.710 |
| AAG/T2 | 1.611 | 3.884 | 1.748 | 1.730 |
| TTL/T5 | 7.747 | 5.924 | 5.543 | 5.939 |
| ALT/(T4+G56) | 7.908 | 7.248 | 8.767 | 7.878 |
| AAG/T4 | 3.503 | 4.972 | 3.040 | 3.435 |
| ALT/(G23+G34+G56) | 14.845 | 10.276 | 15.936 | 12.774 |
| TTL/(T5+T6) | 4.250 | 3.295 | 3.425 | 3.608 |
| TTL/(T4+G56) | 13.999 | 13.903 | 15.097 | 13.900 |
| AAG/G45 | 3.625 | 4.676 | 4.096 | 4.327 |
| EFL/T5 | 3.210 | 2.897 | 2.416 | 2.716 |
| BFL/T3 | 3.290 | 3.764 | 4.085 | 3.941 |
| AAG/T5 | 1.508 | 1.467 | 0.996 | 1.109 |
| (G12+T5)/(G23+G34+G56) | 6.096 | 6.164 | 7.678 | 6.031 |
| TL/(T1+T5) | 3.631 | 3.632 | 3.059 | 3.231 |
| ALT/(T3+G56) | 6.350 | 6.241 | 8.826 | 7.076 |
| TTL/(T2+T6) | 4.404 | 5.040 | 4.665 | 4.615 |
| TL/(T3+T5) | 3.757 | 3.340 | 3.180 | 3.264 |

FIG. 45

OPTICAL IMAGING LENS

CROSS REFERENCE TO RELATED APPLICATION

This application claims the priority benefit of China application serial no. 201810294461.2, filed on Mar. 30, 2018. The entirety of the above-mentioned patent application is hereby incorporated by reference herein and made a part of specification.

BACKGROUND OF THE INVENTION

Technical Field

The invention relates to an optical imaging lens.

Description of Related Art

The specification of consumer electronic products is ever changing and the demand for lighter, thinner, and smaller products never stops growing, which is why the specification of key components (optical imaging lenses and etc.) of the electronic products must also continue to be enhanced, so as to satisfy consumers' demands. The most important features of the optical imaging lenses include imaging quality and volume. In addition, it is increasingly important to enhance field of view as well as maintain a certain aperture size. When it comes to imaging quality, as image sensing technologies advance, the consumer's demands on imaging quality also become higher. Accordingly, in the field of optical lens design, apart from pursing slimness of lenses, the imaging quality and performance of lenses are required to be taken into consideration as well.

However, when designing an optical imaging lens, an optical lens having both a miniaturized size and a desirable imaging quality cannot be manufactured by simply scaling down a lens with a desirable imaging quality. The design not only involves material properties but also needs to take practical production issues, such as manufacturing and assembling yield rates, into consideration.

The technical level of manufacturing a miniaturized lens is higher than that of manufacturing a traditional lens. Therefore, how to manufacture an optical imaging lens meeting the needs of consumer electronic products and facilitate the imaging quality of such optical lens has been an issue of this field.

SUMMARY OF THE INVENTION

The invention provides an optical imaging lens capable of maintaining a preferable optical performance under a condition that a system length of the optical imaging lens is reduced.

An embodiment of the invention provides an optical imaging lens including a first lens element, a second lens element, a third lens element, a fourth lens element, a fifth lens element, and a sixth lens element sequentially arranged along an optical axis from an object side to an image side. Each of the first to sixth lens elements includes an object-side surface facing the object side and allowing imaging rays to pass through and an image-side surface facing the image side and allowing the imaging rays to pass through. The six lens elements are the only lens elements having refracting power in the optical imaging lens. An optical axis region of the image-side surface of the second lens element is convex. An optical axis region of an object-side surface of the third lens element is concave. An optical axis region of an object-side surface of the fourth lens element is convex. The fifth lens element has positive refracting power, and an optical axis region of the object-side surface of the fifth lens element is concave. The optical imaging lens satisfies: $V3-V6 \geq 20{,}000$. V3 is an Abbe number of the third lens element. V6 is an Abbe number of the sixth lens element.

An embodiment of the invention provides an optical imaging lens including a first lens element, a second lens element, a third lens element, a fourth lens element, a fifth lens element, and a sixth lens element sequentially arranged along an optical axis from an object side to an image side. Each of the first to sixth lens elements includes an object-side surface facing the object side and allowing imaging rays to pass through and an image-side surface facing the image side and allowing the imaging rays to pass through. The six lens elements are the only lens elements having refracting power in the optical imaging lens. An optical axis region of the image-side surface of the second lens element is convex. An optical axis region of an object-side surface of the third lens element is concave. The fifth lens element has positive refracting power, and an optical axis region of the object-side surface of the fifth lens element is concave. The optical imaging lens satisfies: $V3-V6 \geq 20{,}000$ and $AAG/T4 \leq 5{,}000$. V3 is an Abbe number of the third lens element. V6 is an Abbe number of the sixth lens element. AAG is a sum of five air gaps from the first lens element to the sixth lens element along the optical axis. T4 is a thickness of the fourth lens element along the optical axis.

An embodiment of the invention provides an optical imaging lens including a first lens element, a second lens element, a third lens element, a fourth lens element, a fifth lens element, and a sixth lens element sequentially arranged along an optical axis from an object side to an image side. Each of the first to sixth lens elements includes an object-side surface facing the object side and allowing imaging rays to pass through and an image-side surface facing the image side and allowing the imaging rays to pass through. The six lens elements are the only lens elements having refracting power in the optical imaging lens. An optical axis region of the image-side surface of the second lens element is convex. An optical axis region of an object-side surface of the third lens element is concave. An optical axis region of an object-side surface of the fifth lens element is concave. The optical imaging lens satisfies: $V3-V6 \geq 20{,}000$ and $AAG/T5 \leq 1{,}800$. V3 is an Abbe number of the third lens element. V6 is an Abbe number of the sixth lens element. AAG is a sum of five air gaps from the first lens element to the sixth lens element along the optical axis. T5 is a thickness of the fifth lens element along the optical axis.

Based on the above, the optical imaging lens according to the embodiments of the invention is effective in terms of the following. By design and arranging the concave/convex shapes of the object-side surfaces or image-side surfaces of the lens elements, the optical imaging lens is still provided with an optical performance capable of overcoming aberrations and renders a greater field of view under the condition that the system length of the optical imaging lens is reduced.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6 is a schematic diagram illustrating an optical imaging lens according to a first embodiment of the invention.

FIGS. 7A to 7D are diagrams illustrating a longitudinal spherical aberration and various aberrations of the optical imaging lens according to the first embodiment.

FIG. 8 shows detailed optical data of the optical imaging lens according to the first embodiment of the invention.

FIG. 9 shows aspheric parameters pertaining to the optical imaging lens according to the first embodiment of the invention.

FIG. 12 shows detailed optical data of the optical imaging lens according to the second embodiment of the invention.

FIG. 13 shows aspheric parameters pertaining to the optical imaging lens according to the second embodiment of the invention.

FIG. 14 is a schematic diagram illustrating an optical imaging lens according to a third embodiment of the invention.

FIGS. 15A to 15D are diagrams illustrating a longitudinal spherical aberration and various aberrations of the optical imaging lens according to the third embodiment.

FIG. 16 shows detailed optical data of the optical imaging lens according to the third embodiment of the invention.

FIG. 17 shows aspheric parameters pertaining to the optical imaging lens according to the third embodiment of the invention.

FIG. 18 is a schematic diagram illustrating an optical imaging lens according to a fourth embodiment of the invention.

FIGS. 19A to 19D are diagrams illustrating a longitudinal spherical aberration and various aberrations of the optical imaging lens according to the fourth embodiment.

FIG. 20 shows detailed optical data of the optical imaging lens according to the fourth embodiment of the invention.

FIG. 21 shows aspheric parameters pertaining to the optical imaging lens according to the fourth embodiment of the invention.

FIG. 22 is a schematic diagram illustrating an optical imaging lens according to a fifth embodiment of the invention.

FIGS. 23A to 23D are diagrams illustrating a longitudinal spherical aberration and various aberrations of the optical imaging lens according to the fifth embodiment.

FIG. 24 shows detailed optical data of the optical imaging lens according to the fifth embodiment of the invention.

FIG. 25 shows aspheric parameters pertaining to the optical imaging lens according to the fifth embodiment of the invention.

FIG. 26 is a schematic diagram illustrating an optical imaging lens according to a sixth embodiment of the invention.

FIGS. 27A to 27D are diagrams illustrating a longitudinal spherical aberration and various aberrations of the optical imaging lens according to the sixth embodiment.

FIG. 28 shows detailed optical data of the optical imaging lens according to the sixth embodiment of the invention.

FIG. 29 shows aspheric parameters pertaining to the optical imaging lens according to the sixth embodiment of the invention.

FIG. 30 is a schematic diagram illustrating an optical imaging lens according to a seventh embodiment of the invention.

FIGS. 31A to 31D are diagrams illustrating a longitudinal spherical aberration and various aberrations of the optical imaging lens according to the seventh embodiment.

FIG. 32 shows detailed optical data of the optical imaging lens according to the seventh embodiment of the invention.

FIG. 33 shows aspheric parameters pertaining to the optical imaging lens according to the seventh embodiment of the invention.

FIG. 34 is a schematic diagram illustrating an optical imaging lens according to an eighth embodiment of the invention.

FIGS. 35A to 35D are diagrams illustrating a longitudinal spherical aberration and various aberrations of the optical imaging lens according to the eighth embodiment.

FIG. 36 shows detailed optical data of the optical imaging lens according to the eighth embodiment of the invention.

FIG. 37 shows aspheric parameters pertaining to the optical imaging lens according to the eighth embodiment of the invention.

FIG. 40 shows detailed optical data of the optical imaging lens according to the ninth embodiment of the invention.

FIG. 41 shows aspheric parameters pertaining to the optical imaging lens according to the ninth embodiment of the invention.

FIGS. 42 to 45 show values of respective important parameters and relations thereof of the optical imaging lenses according to the first to ninth embodiments of the invention.

DESCRIPTION OF THE EMBODIMENTS

Figures 1, 2:
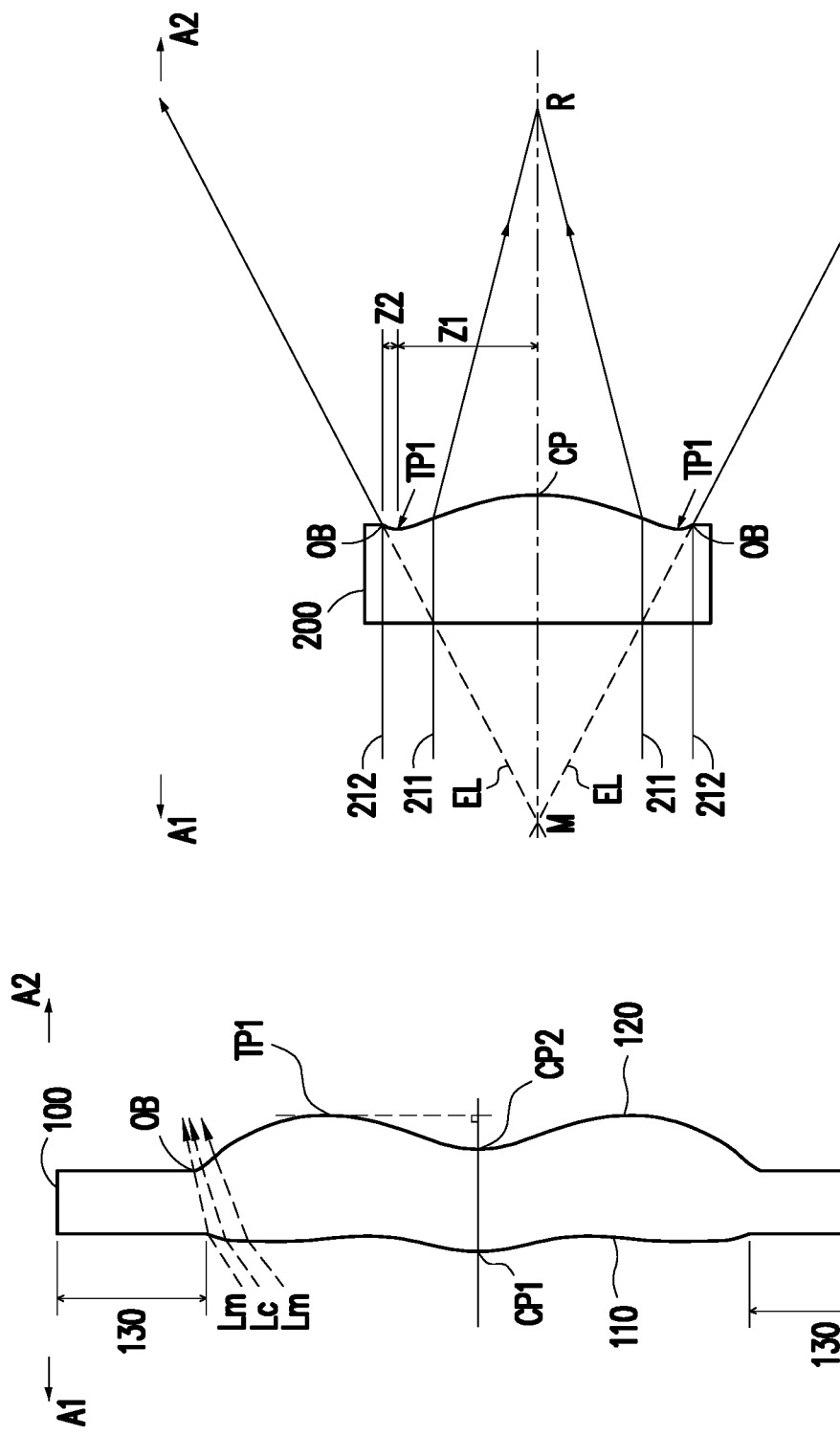
FIG. 1 is a schematic diagram illustrating a surface shape structure of a lens element.
FIG. 2 is a schematic diagram illustrating surface shape concave and convex structures and a light focal point of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
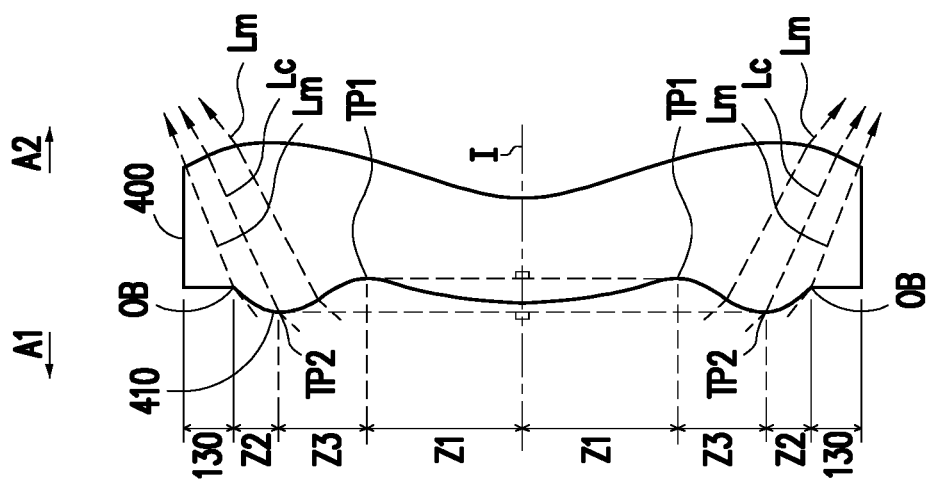
FIG. 4 is a schematic diagram illustrating a surface shape structure of a lens element according to Example 2.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 5:
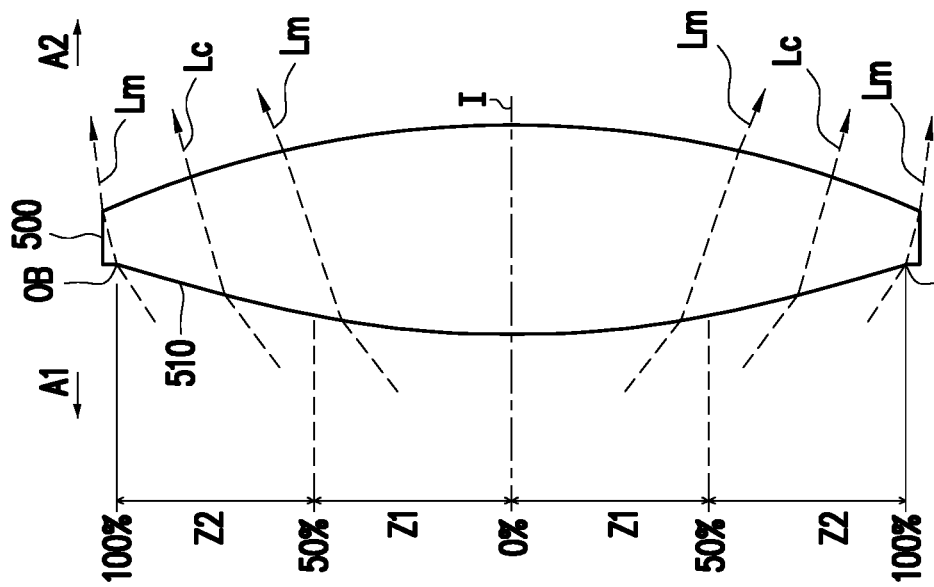
FIG. 5 is a schematic diagram illustrating a surface shape structure of a lens element according to Example 3.
Figure 3:
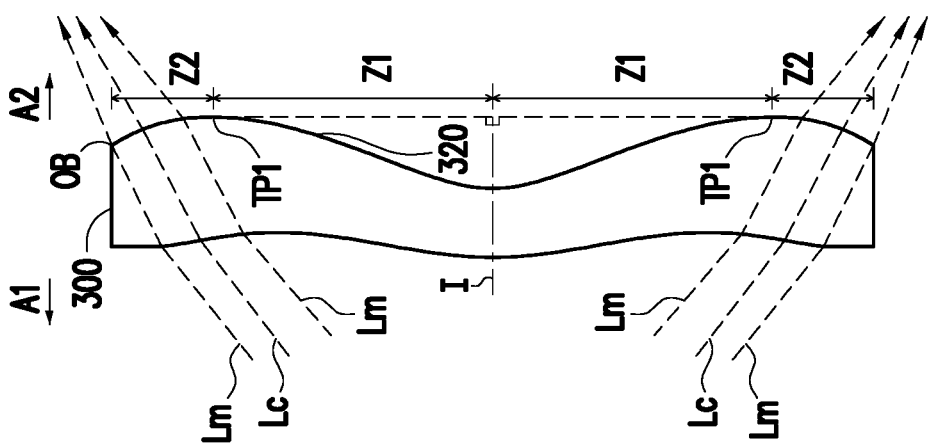
FIG. 3 is a schematic diagram illustrating a surface shape structure of a lens element according to Example 1.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

FIG. 6 is a schematic diagram illustrating an optical imaging lens according to a first embodiment of the invention. FIGS. 7A to 7D are diagrams illustrating a longitudinal spherical aberration and various aberrations of the optical imaging lens according to the first embodiment. Referring to FIG. 6, an optical imaging lens 10 includes a first lens element 1, an aperture 0, a second lens element 2, a third lens element 3, a fourth lens element 4, a fifth lens element 5, a sixth lens element 6, and a filter 9 sequentially arranged from an object side to an image side along an optical axis I. When a ray emitted from an object to be shot enters the optical imaging lens 10, an image may be formed on an image plane 99 after the ray passes through the first lens element 1, the aperture 0, the second lens element 2, the third lens element 3, the fourth lens element 4, the fifth lens element 5, the sixth lens element 6, and the filter 9. The filter 9 may be an infrared cut-off filter, for example, and is adapted to prevent a portion of infrared light in the ray from being transmitted to the image plane 99 and affecting the imaging quality. It is noted that, the object side is a side facing the object to be shot, whereas the image side is a side facing the image plane 99.

The first lens element 1, the second lens element 2, the third lens element 3, the fourth lens element 4, the fifth lens element 5, the sixth lens element 6, and the filter 9 respectively have object-side surfaces 15, 25, 35, 45, 55, 65, and 95 facing the object side and allowing imaging rays to pass through and image-side surfaces 16, 26, 36, 46, 56, 66, and 96 facing the image side and allowing the imaging rays to pass through.

To meet the needs for weight reduction of the product, materials of the first lens element 1 to the sixth lens element 6 may be plastic. However, the materials of the first lens element 1 to the sixth lens element 6 are not limited thereto.

The first lens element 1 has negative refracting power. On the object-side surface 15 of the first lens element 1, an optical axis region 152 is concave, and a periphery region 153 is convex. In addition, on the image-side surface 16 of the first lens element 1, an optical axis region 162 and a periphery region 164 are both concave.

The second lens element 2 has positive refracting power. On the object-side surface 25 of the second lens element 2, an optical axis region 251 and a periphery region 253 are both convex. In addition, on the image-side surface 26 of the second lens element 2, an optical axis region 261 and a periphery region 263 are both convex.

The third lens element 3 has positive refracting power. On the object-side surface 35 of the third lens element 3, an optical axis region 352 and a periphery region 354 are both concave. In addition, on the image-side surface 36 of the second lens element 3, an optical axis region 361 and a periphery region 363 are both convex.

The fourth lens element 4 has negative refracting power. On the object-side surface 45 of the fourth lens element 4, an optical axis region 451 is convex, and a periphery region 454 is concave. In addition, on the image-side surface 46 of the fourth lens element 4, an optical axis region 462 is concave, and a periphery region 463 is convex.

The fifth lens element 5 has positive refracting power. On the object-side surface 55 of the fifth lens element 5, an optical axis region 552 and a periphery region 554 are both concave. In addition, on the image-side surface 56 of the fifth lens element 5, an optical axis region 561 and a periphery region 563 are both convex.

The sixth lens element 6 has negative refracting power. On the object-side surface 65 of the sixth lens element 6, an optical axis region 651 is convex, and a periphery region 654 is concave. In addition, on the image-side surface 66 of the sixth lens element 6, an optical axis region 662 is concave, and a periphery region 663 is convex.

In the optical imaging lens 10, only the above lens elements have refracting power, and the number of lens elements having refracting power in the optical imaging lens 10 is six.

Other detailed optical data of the first embodiment are as shown in FIG. 8. The system length (TTL) of the whole optical imaging lens 10 of the first embodiment is 5,411 mm, the effective focal length (EFL) thereof is 2,115 mm, the half field of view (HFOV) thereof is 58,533°, the image height thereof is 2,880 mm, and the f-number (Fno) thereof is 2,250. The system length refers to a distance from the object-side surface 15 of the first lens element 1 to the image plane 99 along the optical axis I.

Besides, in the embodiment, the object-side surfaces and the image-side surfaces of the six lens elements, totaling 12 surfaces, are all aspheric surfaces. In addition, the aspheric surfaces are defined based on the following equation:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^i \quad (1)$$

wherein:

Y represents a vertical distance from a point on an aspheric curve to the optical axis I;

Z represents a depth of an aspheric surface (a vertical distance between the point on the aspheric surface that is spaced by the distance Y from the optical axis I and a tangent plane tangent to a vertex of the aspheric surface on the optical axis I);

R represents a radius of curvature of the surface of the lens element proximate the optical axis I;

K represents a conic constant;

$a_{2i}$ represents a $2i^{th}$ aspheric coefficient.

Respective aspheric coefficients of the object-side surfaces 15, 25, 35, 45, 55, and 65 and the image-side surfaces 16, 26, 36, 46, 56, and 66 in Equation (1) are as shown in FIG. 9. For example, the row number 15 in FIG. 9 indicates the aspheric coefficients of the object-side surface 15 of the first lens element 1. Other rows are arranged based on the same principle.

In addition, relations of important parameters in the optical imaging lens 10 according to the first embodiment are as shown in FIGS. 42 and 43. In the optical imaging lens 10 of the first embodiment, V1 is an Abbe number of the first lens element 1, wherein the Abbe number may also be referred to as a dispersion coefficient;

V2 is an Abbe number of the second lens element 2;

V3 is an Abbe number of the third lens element 3;

V4 is an Abbe number of the fourth lens element 4;

V5 is an Abbe number of the fifth lens element 5;

V6 is an Abbe number of the sixth lens element 6;

T1 is a thickness of the first lens element 1 along the optical axis I;

T2 is a thickness of the second lens element 2 along the optical axis I;

T3 is a thickness of the third lens element 3 along the optical axis I;

T4 is a thickness of the fourth lens element 4 along the optical axis I;

T5 is a thickness of the fifth lens element 5 along the optical axis I;

T6 is a thickness of the sixth lens element 6 along the optical axis I;

TF is a thickness of the filter 9 along the optical axis I;

G12 is an air gap from the first lens element 1 to the second lens element 2 along the optical axis I;

G23 is an air gap from the second lens element 2 to the third lens element 3 along the optical axis I;

G34 is an air gap from the third lens element 3 to the fourth lens element 4 along the optical axis I;

G45 is an air gap from the fourth lens element 4 to the fifth lens element 5 along the optical axis I;

G56 is an air gap from the fifth lens element 5 to the sixth lens element 6 along the optical axis I;

G6F is an air gap from the sixth lens element 6 to the filter 9 along the optical axis I;

GFP is an air gap from the filter 9 to the image plane 99 along the optical axis I;

AAG is a sum of the five air gaps from the first lens element 1 to the sixth lens element 6 along the optical axis I, i.e. the sum of the G12, G23, G34, G45, and G56;

ALT is a sum of the thicknesses of the first lens element 1, the second lens element 2, the third lens element 3, the fourth lens element 4, the fifth lens element 5, and the sixth lens element 6 along the optical axis I, i.e. the sum of the T1, T2, T3, T4, T5, and T6;

EFL is an effective focal length of the optical imaging lens 10;

BFL is a distance from the image-side surface 66 of the sixth lens element 6 to the image plane 99 along the optical axis I;

TTL is a distance from the object-side surface 15 of the first lens element 1 to the image plane 99 along the optical axis I;

TL is a distance from the object-side surface 15 of the first lens element 1 to the image-side surface 66 of the sixth lens element 6 along the optical axis I; and HFOV is a half field of view of the optical imaging lens 10.

Referring to FIGS. 7A to 7D, FIG. 7A illustrates the longitudinal spherical aberration of optical imaging lens 10 of the first embodiment when the pupil radius is 0.4701 mm. In FIG. 7A, the curves representing the respective wavelengths are close to each other and approach the center, indicating that off-axis rays in different heights at the respective wavelengths are concentrated in a vicinity of the imaging point. Based on extents of deviation of the curves for the respective wavelengths, imaging point deviations of the off-axis rays in different heights are controlled within a range from −0.04 mm to 0.01 mm. Therefore, the spherical aberration of the same wavelength is reduced in the optical imaging lens of the first embodiment. In addition, the distances among the three representing wavelengths are close, indicating that imaging positions of rays of different wavelengths are concentrated. Hence, chromatic aberration is also suppressed.

FIGS. 7B and 7C respectively illustrate the field curvature aberration in the sagittal direction and the field curvature aberration in the tangential direction on the image plane 99 when the wavelength is 650 mm, 555 mm, and 470 mm. In FIGS. 7B and 7C illustrating the field curvature aberrations, the field curvature aberrations of the three representing wavelengths in the whole field range fall within a range from −0.04 mm to 0.14 mm, indicating that the optical imaging lens of the first embodiment is able to effectively reduce aberration.

FIG. 7D illustrates the distortion aberration on the image plane 99 when the wavelength is 650 mm, 555 mm, and 470 mm. FIG. 7D illustrating the distortion aberration indicates that the distortion aberration is maintained within a range from −18% to 3%, indicating that the distortion aberration of the optical imaging lens of the first embodiment already satisfies the imaging quality requirement of an optical system.

Based on the above, compared with known optical lenses, the optical imaging lens of the first embodiment is able to render a desirable imaging quality under a condition that the system length is reduced to about 5,411 mm. Besides, in the optical imaging lens of the first embodiment, the system length is reduced and the shooting angle is expanded under a condition of maintaining a desirable optical performance. Thus, a product design capable of miniaturization and expanding the field of view is achieved.

Figure 10:
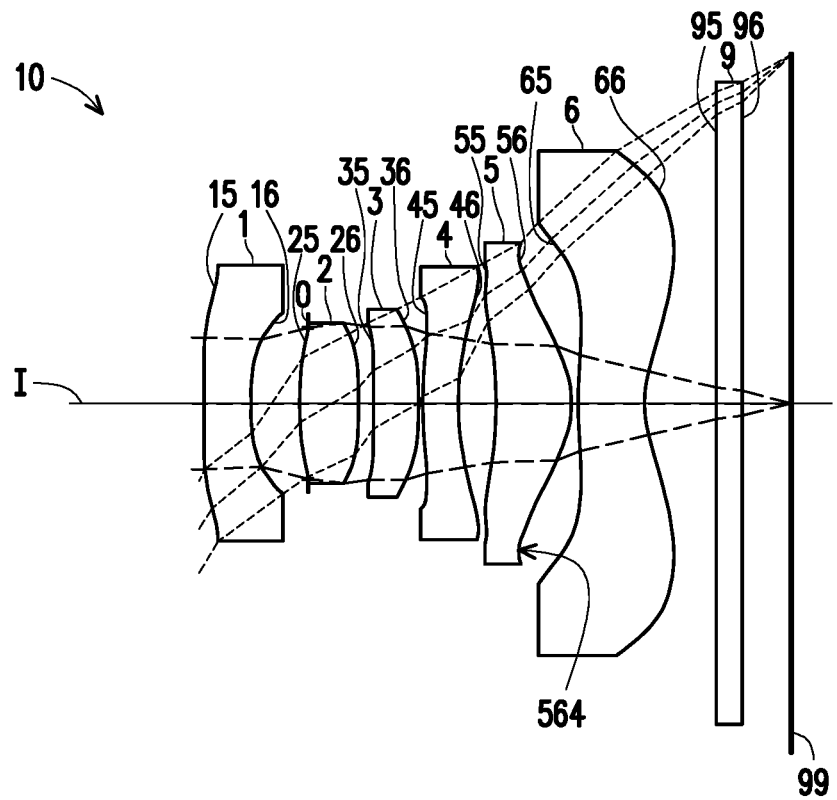
FIG. 10 is a schematic diagram illustrating an optical imaging lens according to a second embodiment of the invention.

FIG. 10 is a schematic diagram illustrating an optical imaging lens according to a second embodiment of the invention. FIGS. 11A to 11D are diagrams illustrating a longitudinal spherical aberration and various aberrations of the optical imaging lens according to the second embodiment. Referring to FIG. 10, the second embodiment of the optical imaging lens 10 is similar to the first embodiment, and the differences therebetween mainly include the following: respective optical data, aspheric coefficients and parameters among the lens elements are different to a more or lesser extent. In addition, a periphery region 564 of the image-side surface 56 of the fifth lens element 5 is concave. To clearly illustrate the drawing, some reference numerals indicating surface shapes same as those of the first embodiment are omitted in FIG. 10.

Detailed optical data of the optical imaging lens 10 are as shown in FIG. 12. The system length (TTL) of the optical imaging lens 10 of the second embodiment is 4,865 mm, the effective focal length (EFL) thereof is 2,497 mm, the half field of view (HFOV) thereof is 58.439°, the image height thereof is 2,880 mm, and the f-number (Fno) thereof is 2.250.

Respective aspheric coefficients of the object-side surfaces and the image-side surfaces of the six lens elements of the second embodiment in Equation (1) are shown in FIG. 13.

In addition, relations of important parameters in the optical imaging lens 10 according to the second embodiment are as shown in FIGS. 42 and 43.

Figures 11A, 11B, 11C, 11D:
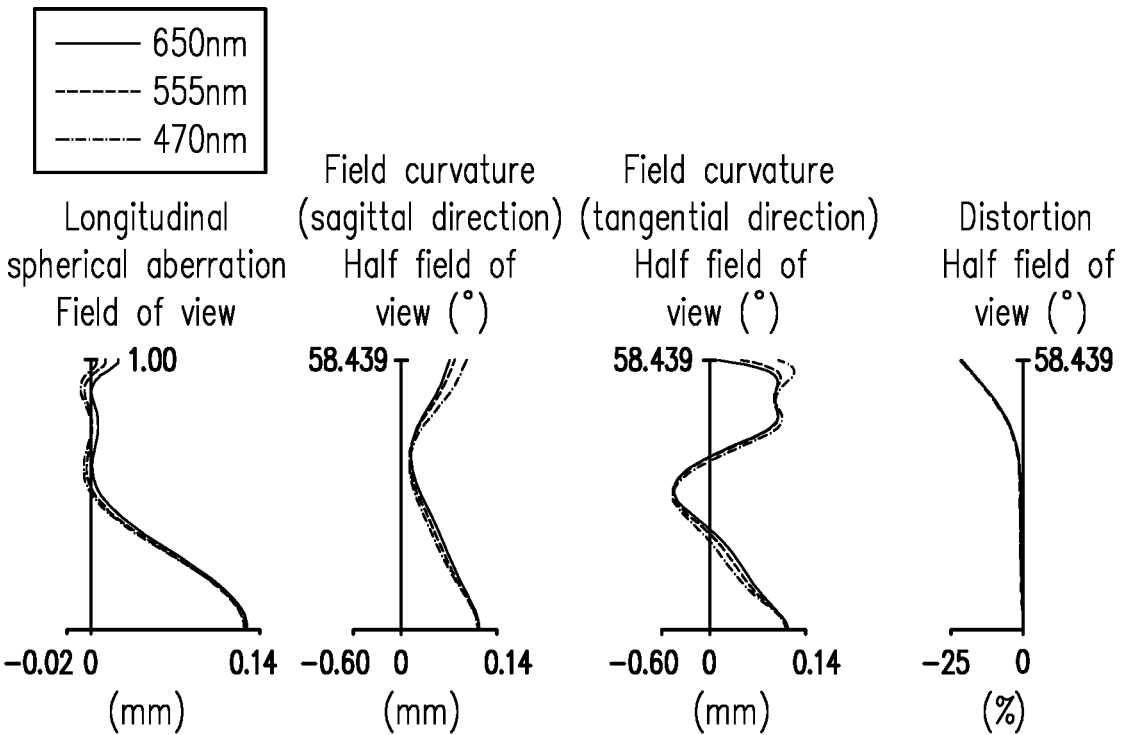
FIGS. 11A to 11D are diagrams illustrating a longitudinal spherical aberration and various aberrations of the optical imaging lens according to the second embodiment.

Referring to FIGS. 11A to 11D, in FIG. 11A illustrating the longitudinal spherical aberration, imaging point deviations of the off-axis rays in different heights are controlled within −0.02 mm to 0.14 mm when the pupil radius is 0.5548 mm. In FIGS. 11B and 11C illustrating the field curvature aberrations, the field curvature aberrations of the three representing wavelengths in the whole field range fall within a range from −0.60 mm to 0.14 mm. In FIG. 11D illustrating the distortion aberration, the distortion aberration is maintained within a range from −25% to 0%. Based on the above, compared with known optical lenses, the optical imaging lens 10 of the second embodiment is able to render a desirable imaging quality under a condition that the system length is reduced to about 4,865 mm.

In addition, based on the above, the second embodiment is more desirable over the first embodiment in that the system length of the second embodiment is less than that of the first embodiment. Besides, because a thickness difference between the optical axis regions and the periphery regions of the lens elements in the second embodiment is less than that of the first embodiment, the lens elements in the second embodiment are easier to be manufactured and thus have higher yield.

FIG. 14 is a schematic diagram illustrating an optical imaging lens according to a third embodiment of the invention. FIGS. 15A to 15D are diagrams illustrating a longitudinal spherical aberration and various aberrations of the optical imaging lens according to the third embodiment. Referring to FIG. 14, the third embodiment of the optical imaging lens 10 is similar to the first embodiment, and the differences therebetween mainly include the following: respective optical data, aspheric coefficients and parameters among the lens elements are different to a more or lesser extent. In addition, a periphery region 564 of the image-side surface 56 of the fifth lens element 5 is concave. To clearly illustrate the drawing, some reference numerals indicating surface shapes same as those of the first embodiment are omitted in FIG. 14.

Detailed optical data of the optical imaging lens 10 are as shown in FIG. 16. The system length (TTL) of the optical imaging lens 10 of the third embodiment is 5,600 mm, the effective focal length (EFL) thereof is 2,173 mm, the half field of view (HFOV) thereof is 58.459°, the image height thereof is 2,880 mm, and the f-number (Fno) thereof is 2.250.

Respective aspheric coefficients of the object-side surfaces and the image-side surfaces of the six lens elements of the third embodiment in Equation (1) are shown in FIG. 17.

In addition, relations of important parameters in the optical imaging lens 10 according to the third embodiment are as shown in FIGS. 42 and 43.

Referring to FIGS. 15A to 15D, in FIG. 15A illustrating the longitudinal spherical aberration, imaging point deviations of the off-axis rays in different heights are controlled within −0.045 mm to 0.025 mm when the pupil radius is 0.4828 mm. In FIGS. 15B and 15C illustrating the field curvature aberrations, the field curvature aberrations of the three representing wavelengths in the whole field range fall within a range from −0.08 mm to 0.06 mm. In FIG. 15D illustrating the distortion aberration, the distortion aberration is maintained within a range from −20% to 4%. Based on the above, compared with known optical lenses, the optical imaging lens 10 of the third embodiment is able to render a desirable imaging quality under a condition that the system length is reduced to about 5,600 mm.

In addition, based on the above, the third embodiment is more desirable over the first embodiment in that the field curvature aberration of the third embodiment is less than that of the first embodiment. Besides, because a thickness difference between the optical axis regions and the periphery regions of the lens elements in the third embodiment is less than that of the first embodiment, the lens elements in the third embodiment are easier to be manufactured and thus have higher yield.

FIG. 18 is a schematic diagram illustrating an optical imaging lens according to a fourth embodiment of the invention. FIGS. 19A to 19D are diagrams illustrating a longitudinal spherical aberration and various aberrations of the optical imaging lens according to the fourth embodiment. Referring to FIG. 18, the fourth embodiment of the optical imaging lens 10 is similar to the first embodiment, and the differences therebetween mainly include the following: respective optical data, aspheric coefficients and parameters among the lens elements are different to a more or lesser extent. In addition, a periphery region 464 of the image-side surface 46 of the fourth lens element 4 is concave, and a periphery region 553 of the object-side surface 55 of the fifth lens element 5 is convex. To clearly illustrate the drawing, some reference numerals indicating surface shapes same as those of the first embodiment are omitted in FIG. 18.

Detailed optical data of the optical imaging lens 10 are as shown in FIG. 20. The system length (TTL) of the optical imaging lens 10 of the fourth embodiment is 5,014 mm, the effective focal length (EFL) thereof is 2,157 mm, the half field of view (HFOV) thereof is 58.520°, the image height thereof is 2,880 mm, and the f-number (Fno) thereof is 2.250.

Respective aspheric coefficients of the object-side surfaces and the image-side surfaces of the six lens elements of the fourth embodiment in Equation (1) are shown in FIG. 21.

In addition, relations of important parameters in the optical imaging lens 10 according to the fourth embodiment are as shown in FIGS. 42 and 43.

Referring to FIGS. 19A to 19D, in FIG. 19A illustrating the longitudinal spherical aberration, imaging point deviations of the off-axis rays in different heights are controlled within −0.035 mm to 0.015 mm when the pupil radius is 0.4793 mm. In FIGS. 19B and 19C illustrating the field curvature aberrations, the field curvature aberrations of the three representing wavelengths in the whole field range fall within a range from −0.07 mm to 0.06 mm. In FIG. 19D illustrating the distortion aberration, the distortion aberration is maintained within a range from −20% to 1%. Based on the above, compared with known optical lenses, the optical imaging lens 10 of the fourth embodiment is able to render a desirable imaging quality under a condition that the system length is reduced to about 5,014 mm.

In addition, based on the above, the fourth embodiment is more desirable over the first embodiment in that the system length of the fourth embodiment is less than that of the first embodiment. The longitudinal spherical aberration, the field curvature aberration, and the distortion aberration of the fourth embodiment are respectively less than the longitudinal spherical aberration, the field curvature aberration, and the distortion aberration of the first embodiment. Besides, because a thickness difference between the optical axis regions and the periphery regions of the lens elements in the fourth embodiment is less than that of the first embodiment, the lens elements in the fourth embodiment are easier to be manufactured and thus have higher yield.

FIG. 22 is a schematic diagram illustrating an optical imaging lens according to a fifth embodiment of the invention. FIGS. 23A to 23D are diagrams illustrating a longitudinal spherical aberration and various aberrations of the optical imaging lens according to the fifth embodiment. Referring to FIG. 22, the fifth embodiment of the optical imaging lens 10 is similar to the first embodiment, and the differences therebetween mainly include the following: respective optical data, aspheric coefficients and parameters among the lens elements are different to a more or lesser extent. Besides, the third lens element 3 has negative refracting power. The periphery region 464 of the image-side surface 46 of the fourth lens element 4 is concave. The periphery region 553 of the object-side surface 55 of the fifth lens element 5 is convex. To clearly illustrate the drawing, some reference numerals indicating surface shapes same as those of the first embodiment are omitted in FIG. 22.

Detailed optical data of the optical imaging lens 10 are as shown in FIG. 24. The system length (TTL) of the optical imaging lens 10 of the fifth embodiment is 4,790 mm, the effective focal length (EFL) thereof is 2,117 mm, the half field of view (HFOV) thereof is 58.438°, the image height thereof is 2,880 mm, and the f-number (Fno) thereof is 2.250.

Respective aspheric coefficients of the object-side surfaces and the image-side surfaces of the six lens elements of the fifth embodiment in Equation (1) are shown in FIG. 25.

In addition, relations of important parameters in the optical imaging lens 10 according to the fifth embodiment are as shown in FIGS. 42 and 43.

Referring to FIGS. 23A to 23D, in FIG. 23A illustrating the longitudinal spherical aberration, imaging point deviations of the off-axis rays in different heights are controlled within −0.03 mm to 0.015 mm when the pupil radius is 0.4704 mm. In FIGS. 23B and 23C illustrating the field curvature aberrations, the field curvature aberrations of the three representing wavelengths in the whole field range fall within a range from −0.12 mm to 0.04 mm. In FIG. 23D illustrating the distortion aberration, the distortion aberration is maintained within a range from −18% to 0%. Based on the above, compared with known optical lenses, the optical imaging lens 10 of the fifth embodiment is able to render a desirable imaging quality under a condition that the system length is reduced to about 4,790 mm.

In addition, based on the above, the fifth embodiment is more desirable over the first embodiment in that the system length of the fifth embodiment is less than that of the first embodiment. The longitudinal spherical aberration, the field curvature aberration, and the distortion aberration of the fifth embodiment are respectively less than the longitudinal spherical aberration, the field curvature aberration, and the distortion aberration of the first embodiment. Besides, because a thickness difference between the optical axis regions and the periphery regions of the lens elements in the fifth embodiment is less than that of the first embodiment, the lens elements in the fifth embodiment are easier to be manufactured and thus have higher yield.

FIG. 26 is a schematic diagram illustrating an optical imaging lens according to a sixth embodiment of the invention. FIGS. 27A to 27D are diagrams illustrating a longitudinal spherical aberration and various aberrations of the optical imaging lens according to the sixth embodiment. Referring to FIG. 26, the sixth embodiment of the optical imaging lens 10 is similar to the first embodiment, and the differences therebetween mainly include the following: respective optical data, aspheric coefficients and parameters among the lens elements are different to a more or lesser extent. To clearly illustrate the drawing, some reference numerals indicating surface shapes same as those of the first embodiment are omitted in FIG. 26.

Detailed optical data of the optical imaging lens 10 are as shown in FIG. 28. The system length (TTL) of the optical imaging lens 10 of the sixth embodiment is 5,035 mm, the effective focal length (EFL) thereof is 2,086 mm, the half field of view (HFOV) thereof is 58.519°, the image height thereof is 2,880 mm, and the f-number (Fno) thereof is 2.250.

Respective aspheric coefficients of the object-side surfaces and the image-side surfaces of the six lens elements of the sixth embodiment in Equation (1) are shown in FIG. 29.

In addition, relations of important parameters in the optical imaging lens 10 according to the sixth embodiment are as shown in FIGS. 44 and 45.

Referring to FIGS. 27A to 27D, in FIG. 27A illustrating the longitudinal spherical aberration, imaging point deviations of the off-axis rays in different heights are controlled within −0.07 mm to 0.02 mm when the pupil radius is 0.4634 mm. In FIGS. 27B and 27C illustrating the field curvature aberrations, the field curvature aberrations of the three representing wavelengths in the whole field range fall within a range from −0.13 mm to 0.05 mm. In FIG. 27D illustrating the distortion aberration, the distortion aberration is maintained within a range from −18% to 2%. Based on the above, compared with known optical lenses, the optical imaging lens 10 of the sixth embodiment is able to render a desirable imaging quality under a condition that the system length is reduced to about 5,035 mm.

In addition, based on the above, the sixth embodiment is more desirable over the first embodiment in that the system length of the sixth embodiment is less than that of the first embodiment. The field curvature aberration and the distortion aberration of the sixth embodiment are respectively less than the field curvature aberration and the distortion aberration of the first embodiment. Besides, because a thickness difference between the optical axis regions and the periphery regions of the lens elements in the sixth embodiment is less than that of the first embodiment, the lens elements in the sixth embodiment are easier to be manufactured and thus have higher yield.

FIG. 30 is a schematic diagram illustrating an optical imaging lens according to a seventh embodiment of the invention. FIGS. 31A to 31D are diagrams illustrating a longitudinal spherical aberration and various aberrations of the optical imaging lens according to the seventh embodiment. Referring to FIG. 30, the seventh embodiment of the optical imaging lens 10 is similar to the first embodiment, and the differences therebetween mainly include the following: respective optical data, aspheric coefficients and parameters among the lens elements are different to a more or lesser extent. Besides, an optical axis region 151 of the object-side surface 15 of the first lens element 1 is convex. A periphery region 353 of the object-side surface 35 of the third lens element 3 is convex. The periphery region 464 of the image-side surface 46 of the fourth lens element 4 is concave. To clearly illustrate the drawing, some reference numerals indicating surface shapes same as those of the first embodiment are omitted in FIG. 30.

Detailed optical data of the optical imaging lens 10 are as shown in FIG. 32. The system length (TTL) of the optical imaging lens 10 of the seventh embodiment is 4,673 mm, the effective focal length (EFL) thereof is 2,285 mm, the half field of view (HFOV) thereof is 58.520°, the image height thereof is 2,880 mm, and the f-number (Fno) thereof is 2.250.

Respective aspheric coefficients of the object-side surfaces and the image-side surfaces of the six lens elements of the seventh embodiment in Equation (1) are shown in FIG. 33.

In addition, relations of important parameters in the optical imaging lens 10 according to the seventh embodiment are as shown in FIGS. 44 and 45.

Referring to FIGS. 31A to 31D, in FIG. 31A illustrating the longitudinal spherical aberration, imaging point deviations of the off-axis rays in different heights are controlled within −0.02 mm to 0.012 mm when the pupil radius is 0.5078 mm. In FIGS. 31B and 31C illustrating the field curvature aberrations, the field curvature aberrations of the three representing wavelengths in the whole field range fall within a range from −0.30 mm to 0.10 mm. In FIG. 31D illustrating the distortion aberration, the distortion aberration is maintained within a range from −25% to 0%. Based on the above, compared with known optical lenses, the optical imaging lens 10 of the seventh embodiment is able to render a desirable imaging quality under a condition that the system length is reduced to about 4,673 mm.

In addition, based on the above, the seventh embodiment is more desirable over the first embodiment in that the system length of the seventh embodiment is less than that of the first embodiment. The longitudinal spherical aberration of the seventh embodiment is less than the longitudinal spherical aberration of the first embodiment. Besides, because a thickness difference between the optical axis regions and the periphery regions of the lens elements in the seventh embodiment is less than that of the first embodiment, the lens elements in the seventh embodiment are easier to be manufactured and thus have higher yield.

FIG. 34 is a schematic diagram illustrating an optical imaging lens according to an eighth embodiment of the invention. FIGS. 35A to 35D are diagrams illustrating a longitudinal spherical aberration and various aberrations of the optical imaging lens according to the eighth embodiment. Referring to FIG. 34, the eighth embodiment of the optical imaging lens 10 is similar to the first embodiment, and the differences therebetween mainly include the following: respective optical data, aspheric coefficients and parameters among the lens elements are different to a more or lesser extent. In addition, a periphery region 464 of the image-side surface 46 of the fourth lens element 4 is concave, and a periphery region 553 of the object-side surface 55 of the fifth lens element 5 is convex. To clearly illustrate the drawing, some reference numerals indicating surface shapes same as those of the first embodiment are omitted in FIG. 34.

Detailed optical data of the optical imaging lens 10 are as shown in FIG. 36. The system length (TTL) of the optical imaging lens 10 of the eighth embodiment is 5,052 mm, the effective focal length (EFL) thereof is 2,202 mm, the half field of view (HFOV) thereof is 58.521°, the image height thereof is 2,880 mm, and the f-number (Fno) thereof is 2.250.

Respective aspheric coefficients of the object-side surfaces and the image-side surfaces of the six lens elements of the eighth embodiment in Equation (1) are shown in FIG. 37.

In addition, relations of important parameters in the optical imaging lens 10 according to the eighth embodiment are as shown in FIGS. 44 and 45.

Referring to FIGS. 35A to 35D, in FIG. 35A illustrating the longitudinal spherical aberration, imaging point deviations of the off-axis rays in different heights are controlled within −0.025 mm to 0.015 mm when the pupil radius is 0.4892 mm. In FIGS. 35B and 35C illustrating the field curvature aberrations, the field curvature aberrations of the three representing wavelengths in the whole field range fall within a range from −0.08 mm to 0.10 mm. In FIG. 35D illustrating the distortion aberration, the distortion aberration is maintained within a range from −21% to 0%. Based on the above, compared with known optical lenses, the optical imaging lens 10 of the eighth embodiment is able to render a desirable imaging quality under a condition that the system length is reduced to about 5,052 mm.

In addition, based on the above, the eighth embodiment is more desirable over the first embodiment in that the system length of the eighth embodiment is less than that of the first embodiment. Besides, because a thickness difference between the optical axis regions and the periphery regions of the lens elements in the eighth embodiment is less than that of the first embodiment, the lens elements in the eighth embodiment are easier to be manufactured and thus have higher yield.

Figure 38:
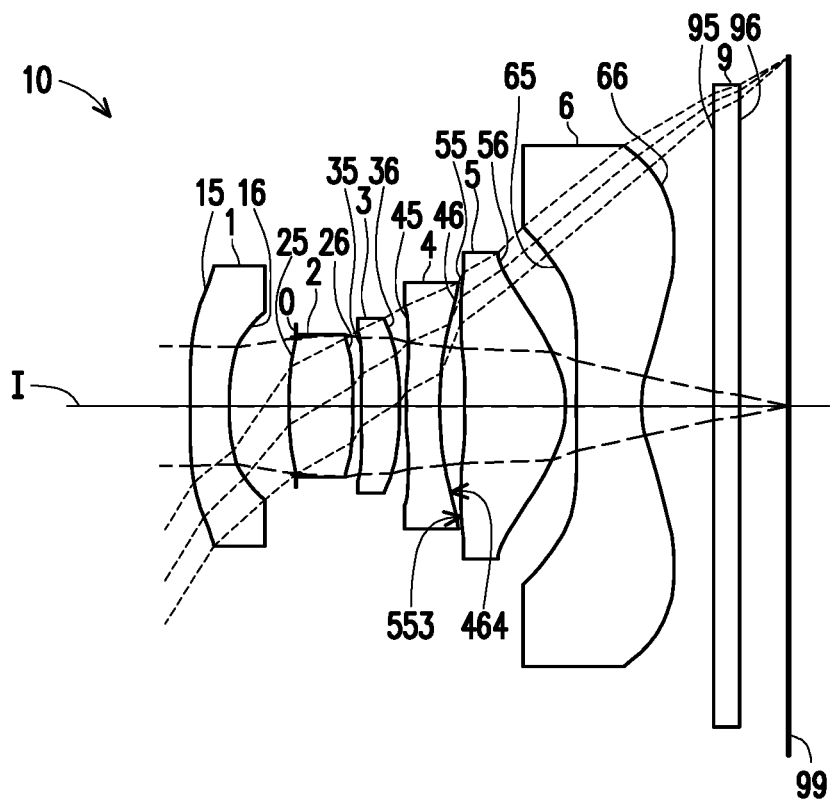
FIG. 38 is a schematic diagram illustrating an optical imaging lens according to a ninth embodiment of the invention.

FIG. 38 is a schematic diagram illustrating an optical imaging lens according to a ninth embodiment of the invention. FIGS. 39A to 39D are diagrams illustrating a longitudinal spherical aberration and various aberrations of the optical imaging lens according to the ninth embodiment. Referring to FIG. 38, the ninth embodiment of the optical imaging lens 10 is similar to the first embodiment, and the differences therebetween mainly include the following: respective optical data, aspheric coefficients and parameters among the lens elements are different to a more or lesser extent. In addition, a periphery region 464 of the image-side surface 46 of the fourth lens element 4 is concave, and a periphery region 553 of the object-side surface 55 of the fifth lens element 5 is convex. To clearly illustrate the drawing, some reference numerals indicating surface shapes same as those of the first embodiment are omitted in FIG. 38.

Detailed optical data of the optical imaging lens 10 are as shown in FIG. 40. The system length (TTL) of the optical imaging lens 10 of the ninth embodiment is 4,913 mm, the effective focal length (EFL) thereof is 2,247 mm, the half field of view (HFOV) thereof is 58.522°, the image height thereof is 2,880 mm, and the f-number (Fno) thereof is 2.250.

Respective aspheric coefficients of the object-side surfaces and the image-side surfaces of the six lens elements of the ninth embodiment in Equation (1) are shown in FIG. 41.

In addition, relations of important parameters in the optical imaging lens 10 according to the ninth embodiment are as shown in FIGS. 44 and 45.

Figures 39A, 39B, 39C, 39D:
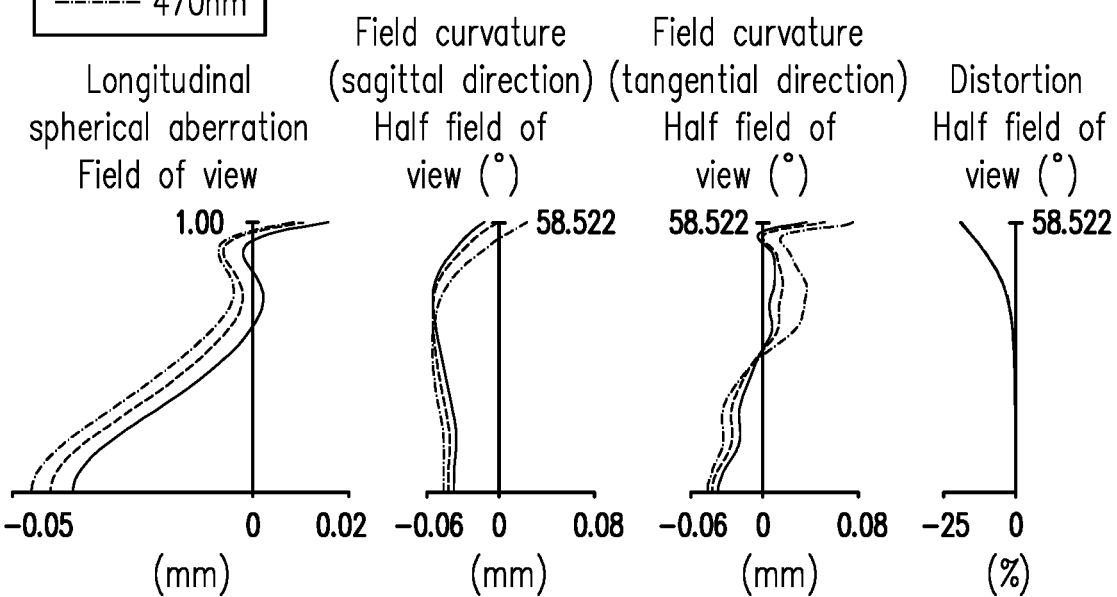
FIGS. 39A to 39D are diagrams illustrating a longitudinal spherical aberration and various aberrations of the optical imaging lens according to the ninth embodiment.

Referring to FIGS. 39A to 39D, in FIG. 39A illustrating the longitudinal spherical aberration, imaging point deviations of the off-axis rays in different heights are controlled within −0.05 mm to 0.02 mm when the pupil radius is 0.4993 mm. In FIGS. 39B and 39C illustrating the field curvature aberrations, the field curvature aberrations of the three representing wavelengths in the whole field range fall within a range from −0.06 mm to 0.08 mm. In FIG. 39D illustrating the distortion aberration, the distortion aberration is maintained within a range from −25% to 0%. Based on the above, compared with known optical lenses, the optical imaging lens 10 of the ninth embodiment is able to render a desirable imaging quality under a condition that the system length is reduced to about 4,913 mm.

In addition, based on the above, the ninth embodiment is more desirable over the first embodiment in that the system length of the ninth embodiment is less than that of the first embodiment. The field curvature aberration of the ninth embodiment is less than the field curvature aberration of the first embodiment. Besides, because a thickness difference between the optical axis regions and the periphery regions of the lens elements in the ninth embodiment is less than that of the first embodiment, the lens elements in the ninth embodiment are easier to be manufactured and thus have higher yield.

In the respective embodiments of the invention, light can be effectively converged as the optical axis region of the image-side surface of the second lens element is convex, and in coordination with that the optical axis region of the object-side surface of the third lens element is concave. Since the optical axis region of the object-side surface of the fifth lens element is concave, the fifth lens element has positive refracting power, and in coordination with that the optical axis region of the object side surface of the fourth lens element is convex or AAG/T4≤5.0 or AAG/T5≤1.8, it is beneficial for the correction of the aberrations under a premise that a greater field of view is provided. Herein, a preferable range of AAG/T4 is 3,000 to 5,000, and a preferable range of AAG/T5 is 0.900 to 1,800. When V3−V6≥20,000 is satisfied, the system length can be reduced and the imaging quality can be ensured, wherein a preferable range of V3-V6 is 20,000 to 40,000.

In order to reduce the system length and ensure the imaging quality, the air gap between lens elements or the thickness of the lens element may be suitably reduced. Nevertheless, considering the manufacturing complexity, a configuration is desirable if at least one of the following condition expressions is satisfied.

3,600≤(T1+G12)/(G23+G34+G56), preferably 3,600≤(T1+G12)/(G23+G34+G56)≤5,700;

4,600≤EFL/(T3+G56), preferably 4,600≤EFL/(T3+G56)≤6,800;

AAG/T2≤4,000, preferably 1,600≤AAG/T2≤4,000;

3,700≤ALT/(T4+G56), preferably 3,700≤ALT/(T4+G56)≤10,000;

10,200≤ALT/(G23+G34+G56), preferably 10,200≤ALT/(G23+G34+G56)≤18,200;

AAG/G45≤6,000, preferably 2,900≤AAG/G45≤6,000;

EFL/T5≤4,200, preferably 2,200≤EFL/T5≤4,200;

3,100≤BFL/T3, preferably 3,100≤BFL/T3≤6,000;

4,500≤(G12+T5)/(G23+G34+G56), preferably 4,500≤(G12+T5)/(G23+G34+G56)≤9,000; and 6,200≤ALT/(T3+G56), preferably 6,200≤ALT/(T3+G56)≤9,300.

If at least one of the following condition expressions is satisfied, the ratio of the optical element parameters to the system length is maintained to be within an appropriate range, so as to prevent the optical element parameters from becoming too small, which is detrimental to the production of the optical imaging lens, or to prevent the optical element parameters from becoming too large, which may lead to excessive system length TTL/(T1+T5)≤4,800, preferably 3,900≤TTL/(T1+T5)≤4,800;

TTL/T5≤7,800, preferably 5,300≤TTL/T5≤7,800;

TTL/(T5+T6)≤6,000, preferably 3,200≤TTL/(T5+T6)≤6,000;

13,800≤TTL/(T4+G56), preferably 13,800≤TTL/(T4+G56)≤17,000;

TL/(T1+T5)≤4,100, preferably 2,900≤TL/(T1+T5)≤4,100;

TTL/(T2+T6)≤5,100, preferably 4,400≤TTL/(T2+T6)≤5,100; and

TL/(T3+T5)≤4,000, preferably 3,000≤TL/(T3+T5)≤4,000.

In addition, it is optional to select a random combination relationship of the parameter in the embodiment to increase limitation of the optical imaging lens for the ease of designing the optical imaging lens having the same structure in the invention. Considering the unpredictability in the design of optical system, under the framework of the embodiments of the invention, the embodiments of the invention may have shorter system length, greater aperture availability, desirable imaging quality, or a facilitated assembling yield rate if the above condition expressions are satisfied so as to improve the shortcoming of prior art.

An arbitrary number of the exemplary limiting relations listed above may also be arbitrarily and optionally combined and incorporated into the embodiments of the invention. The invention shall not be construed as being limited thereto. In implementation of the invention, apart from the above-described relations, it is also possible to add additional detailed structure such as more concave and convex curvatures arrangement of a specific lens element or a plurality of lens elements so as to enhance control of system property and/or resolution. It should be noted that the above-described details can be optionally combined and applied to the other embodiments of the invention under the condition where they are not in conflict with one another.

In view of the foregoing, the optical imaging lens according to one or some exemplary embodiments of the invention is able to render one or some of the following:

i. The longitudinal spherical aberrations, field curvature aberrations, and distortion aberrations of the respective embodiments of the invention meet the protocol of use. In addition, the off-axis rays of the three representing wavelengths, i.e., 650 nm, 555 nm, and 470 nm, in different heights are all concentrated at a vicinity of the imaging point. The extents of deviation of the respective curves show that the imaging point deviations of the off-axis rays in different heights are controlled, so a desirable suppressing ability against spherical aberration, image aberration, and distortion aberration is rendered. The imaging quality data further suggest that the distances among the three representing wavelengths, i.e., 650 nm, 555 nm, and 470 nm, are close to each other, indicating that the embodiments of the invention are able to desirably concentrate rays of different wavelengths in various states and exhibit an excellent dispersion suppressing ability. Therefore, the embodiments of the invention render a desirable optical performance.

ii. An arbitrary number of the exemplary limiting relations listed above may also be arbitrarily and optionally combined and incorporated into the embodiments of the invention. The invention shall not be construed as being limited thereto.

iii. The maximum and minimum numeral values derived from the combinations of the optical parameters disclosed in the embodiments of the invention may all be applicable and enable people skill in the pertinent art to implement the invention.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical imaging lens, comprising a first lens element, a second lens element, a third lens element, a fourth lens element, a fifth lens element, and a sixth lens element sequentially arranged along an optical axis from an object side to an image side, each of the first lens element to the sixth lens element comprising an object-side surface facing the object side and allowing imaging rays to pass through and an image-side surface facing the image side and allowing the imaging rays to pass through, the six lens elements being the only lens elements having refracting power in the optical imaging lens, wherein
an optical axis region of the image-side surface of the second lens element is convex;
an optical axis region of the object-side surface of the third lens element is concave;
an optical axis region of the object-side surface of the fourth lens element is convex;
the fifth lens element has positive refracting power, and an optical axis region of the object-side surface of the fifth lens element is concave; and
the optical imaging lens satisfies: $V3-V6 \geq 20.000$ and $TTL/(T1+T5) \leq 4.800$, wherein V3 is an Abbe number of the third lens element, V6 is an Abbe number of the sixth lens element, TTL is a distance from the object-side surface of the first lens element to an image plane along the optical axis, T1 is a thickness of the first lens element along the optical axis, and T5 is a thickness of the fifth lens element along the optical axis.

2. The optical imaging lens as claimed in claim 1, wherein the optical imaging lens satisfies: $(T1+G12)/(G23+G34+G56) \geq 3.600$, wherein G12 is an air gap from the first lens element to the second lens element along the optical axis, G23 is an air gap from the second lens element to the third lens element along the optical axis, G34 is an air gap from the third lens element to the fourth lens element along the optical axis, and G56 is an air gap from the fifth lens element to the sixth lens element along the optical axis.

3. The optical imaging lens as claimed in claim 1, wherein the optical imaging lens satisfies: $EFL/(T3+G56) \geq 4.600$, wherein EFL is an effective focal length of the optical imaging lens, T3 is a thickness of the third lens element along the optical axis, and G56 is an air gap from the fifth lens element to the sixth lens element along the optical axis.

4. The optical imaging lens as claimed in claim 1, wherein the optical imaging lens satisfies: $AAG/T2 \leq 4.000$, wherein AAG is a sum of five air gaps from the first lens element to the sixth lens element along the optical axis, and T2 is a thickness of the second lens element along the optical axis.

5. The optical imaging lens as claimed in claim 1, wherein the optical imaging lens satisfies: $TTL/T5 \leq 7.800$.

6. The optical imaging lens as claimed in claim 1, wherein the optical imaging lens satisfies: $ALT/(T4+G56) \geq 3.700$, wherein ALT is a sum of thicknesses of the first lens element, the second lens element, the third lens element, the fourth lens element, the fifth lens element, and the sixth lens element along the optical axis, T4 is the thickness of the fourth lens element along the optical axis, and G56 is an air gap from the fifth lens element to the sixth lens element along the optical axis.

7. An optical imaging lens, comprising a first lens element, a second lens element, a third lens element, a fourth lens element, a fifth lens element, and a sixth lens element sequentially arranged along an optical axis from an object side to an image side, each of the first lens element to the sixth lens element comprising an object-side surface facing the object side and allowing imaging rays to pass through and an image-side surface facing the image side and allowing the imaging rays to pass through, the six lens elements being the only lens elements having refracting power in the optical imaging lens, wherein
an optical axis region of the image-side surface of the second lens element is convex;
an optical axis region of the object-side surface of the third lens element is concave;
the fifth lens element has positive refracting power, and an optical axis region of the object-side surface of the fifth lens element is concave; and
the optical imaging lens satisfies: $V3-V6 \geq 20.000$, $TTL/(T1+T5) \leq 4.800$ and $AAG/T4 \leq 5.000$, wherein V3 is an Abbe number of the third lens element, V6 is an Abbe number of the sixth lens element, TTL is a distance from the object-side surface of the first lens element to an image plane along the optical axis, T1 is a thickness of the first lens element along the optical axis, T5 is a thickness of the fifth lens element along the optical axis, AAG is a sum of five air gaps from the first lens element to the sixth lens element along the optical axis, and T4 is a thickness of the fourth lens element along the optical axis.

8. The optical imaging lens as claimed in claim 7, wherein the optical imaging lens satisfies: $ALT/(G23+G34+G56) \geq 10.200$, wherein ALT is a sum of thicknesses of the first lens element, the second lens element, the third lens element, the fourth lens element, the fifth lens element, and the sixth lens element along the optical axis, G23 is the air gap from the second lens element to the third lens element along the optical axis, G34 is the air gap from the third lens element to the fourth lens element along the optical axis, and G56 is the air gap from the fifth lens element to the sixth lens element along the optical axis.

9. The optical imaging lens as claimed in claim 7, wherein the optical imaging lens satisfies: TTL/(T5+T6)≤6.000, wherein T6 is a thickness of the sixth lens element along the optical axis.

10. The optical imaging lens as claimed in claim 7, wherein the optical imaging lens satisfies: TTL/(T4+G56) ≥13.800, wherein G56 is the air gap from the fifth lens element to the sixth lens element along the optical axis.

11. The optical imaging lens as claimed in claim 7, wherein the optical imaging lens satisfies: AAG/G45≤6.000, wherein G45 is the air gap from the fourth lens element to the fifth lens element along the optical axis.

12. The optical imaging lens as claimed in claim 7, wherein the optical imaging lens satisfies: EFL/T5≤4.200, wherein EFL is an effective focal length of the optical imaging lens.

13. The optical imaging lens as claimed in claim 7, wherein the optical imaging lens satisfies: BFL/T3≥3.100, wherein BFL is a distance from the image-side surface of the sixth lens element to an image plane along the optical axis, and T3 is a thickness of the third lens element along the optical axis.

14. An optical imaging lens, comprising a first lens element, a second lens element, a third lens element, a fourth lens element, a fifth lens element, and a sixth lens element sequentially arranged along an optical axis from an object side to an image side, each of the first lens element to the sixth lens element comprising an object-side surface facing the object side and allowing imaging rays to pass through and an image-side surface facing the image side and allowing the imaging rays to pass through, the six lens elements being the only lens elements having refracting power in the optical imaging lens, wherein an optical axis region of the image-side surface of the second lens element is convex;

an optical axis region of the object-side surface of the third lens element is concave;

an optical axis region of the object-side surface of the fifth lens element is concave; and the optical imaging lens satisfies: V3−V6≥20.000, TTL/(T1+T5)≤4.800 and AAG/T5≤1.800, wherein V3 is an Abbe number of the third lens element, V6 is an Abbe number of the sixth lens element, TTL is a distance from the object-side surface of the first lens element to an image plane along the optical axis, T1 is a thickness of the first lens element along the optical axis, AAG is a sum of five air gaps from the first lens element to the sixth lens element along the optical axis, and T5 is a thickness of the fifth lens element along the optical axis.

15. The optical imaging lens as claimed in claim 14, wherein the optical imaging lens satisfies: (G12+T5)/(G23+G34+G56)≥4.500, wherein G12 is the air gap from the first lens element to the second lens element along the optical axis, G23 is the air gap from the second lens element to the third lens element along the optical axis, G34 is the air gap from the third lens element to the fourth lens element along the optical axis, and G56 is the air gap from the fifth lens element to the sixth lens element along the optical axis.

16. The optical imaging lens as claimed in claim 14, wherein the optical imaging lens satisfies: TL/(T1+T5) ≤4.100, wherein TL is a distance from the object-side surface of the first lens element to the image-side surface of the sixth lens element along the optical axis.

17. The optical imaging lens as claimed in claim 14, wherein the optical imaging lens satisfies: ALT/(T3+G56) ≥6.200, wherein ALT is a sum of thicknesses of the first lens element, the second lens element, the third lens element, the fourth lens element, the fifth lens element, and the sixth lens element along the optical axis, T3 is the thickness of the third lens element along the optical axis, and G56 is the air gap from the fifth lens element to the sixth lens element along the optical axis.

18. The optical imaging lens as claimed in claim 14, wherein the optical imaging lens satisfies: TTL/(T2+T6) ≤5.100, wherein T2 is a thickness of the second lens element along the optical axis, and T6 is a thickness of the sixth lens element along the optical axis.

19. The optical imaging lens as claimed in claim 14, wherein the optical imaging lens satisfies: TL/(T3+T5) ≤4.000, wherein TL is a distance from the object-side surface of the first lens element to the image-side surface of the sixth lens element along the optical axis, and T3 is a thickness of the third lens element along the optical axis.

* * * * *